US012090755B2

(12) United States Patent
Fukasawa et al.

(10) Patent No.: US 12,090,755 B2
(45) **Date of Patent: *Sep. 17, 2024**

(54) PRINTING APPARATUS

(71) Applicant: CANON KABUSHIKI KAISHA, Tokyo (JP)

(72) Inventors: Takuya Fukasawa, Kanagawa (JP); Takatoshi Nakano, Kanagawa (JP); Yoshinori Nakagawa, Kanagawa (JP); Atsushi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,637

(22) Filed: Jul. 7, 2023

(65) Prior Publication Data

US 2023/0347642 A1 Nov. 2, 2023

Related U.S. Application Data

(63) Continuation of application No. 17/744,825, filed on May 16, 2022, now Pat. No. 11,780,224, which is a (Continued)

(30) Foreign Application Priority Data

Oct. 5, 2018 (JP) ................................ 2018-189633
Oct. 5, 2018 (JP) ................................ 2018-189663

(51) Int. Cl.
*B41J 2/045* (2006.01)
*B41J 2/175* (2006.01)

(52) U.S. Cl.
CPC ....... *B41J 2/04553* (2013.01); *B41J 2/04586* (2013.01); *B41J 2/175* (2013.01)

(58) Field of Classification Search
CPC .. B41J 2/04586; B41J 2/04563; B41J 2/0451; B41J 2/04551; B41J 2/175;
(Continued)

(56) References Cited

U.S. PATENT DOCUMENTS 6,712,443 B2 3/2004 Kanda et al.
6,830,313 B2 12/2004 Moriyama et al.
(Continued)

FOREIGN PATENT DOCUMENTS

JP 2006-103281 A 4/2006
JP 2006-159811 A 6/2006
(Continued)

OTHER PUBLICATIONS

Oct. 31, 2023 Japanese Official Action in Japanese Patent Appln. No. 2023-018259.
(Continued)

*Primary Examiner* — An H Do
(74) *Attorney, Agent, or Firm* — Venable LLP

(57) ABSTRACT

A printing apparatus includes a print head provided with a discharge port that discharges liquid and a pressure chamber filled with the liquid to be discharged from the discharge port, and configured to perform a printing operation by discharging the liquid from the discharge port based on print data, includes a circulation unit that performs circulation of the liquid in a circulation passage including the pressure chamber in a state where the printing operation is performed, and includes a control unit that controls the circulation unit to continue the circulation for a predetermined time after the printing operation is completed.

24 Claims, 20 Drawing Sheets

Related U.S. Application Data continuation of application No. 17/204,972, filed on Mar. 18, 2021, now Pat. No. 11,358,387, which is a continuation of application No. PCT/JP2019/036656, filed on Sep. 19, 2019.

(58) Field of Classification Search
CPC .. B41J 2/04553; B41J 2/04566; B41J 2/1404; B41J 2/16508; B41J 2/16588; B41J 2202/12; B41J 2002/16573
See application file for complete search history.

(56) References Cited

U.S. PATENT DOCUMENTS

| | | | |
|---|---|---|---|
| 6,896,345 | B2 | 5/2005 | Nakayama et al. |
| 6,913,337 | B2 | 7/2005 | Kuronuma et al. |
| 7,104,625 | B2 | 9/2006 | Kono et al. |
| 7,410,239 | B2 | 8/2008 | Takahashi et al. |
| 7,461,932 | B2 | 12/2008 | Iwasaki et al. |
| 7,537,661 | B2 | 5/2009 | Nakagawa et al. |
| 7,591,545 | B2 | 9/2009 | Iwasaki et al. |
| 7,604,344 | B2 | 10/2009 | Seki et al. |
| 7,614,714 | B2 | 11/2009 | Masuyama et al. |
| 7,669,989 | B2 | 3/2010 | Oshio et al. |
| 7,762,640 | B2 | 7/2010 | Kanda et al. |
| 7,850,273 | B2 | 12/2010 | Yasutani et al. |
| 7,874,656 | B2 | 1/2011 | Ota et al. |
| 7,891,796 | B2 | 2/2011 | Masuyama et al. |
| 7,963,245 | B2 | 6/2011 | Oshio et al. |
| 8,001,921 | B2 | 8/2011 | Oshio et al. |
| 8,038,268 | B2 | 10/2011 | Iwasaki et al. |
| 8,079,659 | B2 | 12/2011 | Tajika et al. |
| 8,079,665 | B2 | 12/2011 | Takahashi et al. |
| 8,186,783 | B2 | 5/2012 | Yasutani et al. |
| 8,205,982 | B2 | 6/2012 | Masuyama et al. |
| 8,210,637 | B2 | 7/2012 | Masuyama et al. |
| 8,240,802 | B2 | 8/2012 | Nakano et al. |
| 8,251,479 | B2 | 8/2012 | Seki et al. |
| 8,251,482 | B1 | 8/2012 | Yasutani et al. |
| 8,328,311 | B2 | 12/2012 | Nakano et al. |
| 8,366,230 | B2 | 2/2013 | Taira et al. |
| 8,371,673 | B2 | 2/2013 | Maru et al. |
| 8,371,677 | B2 | 2/2013 | Fukasawa |
| 8,439,472 | B2 | 5/2013 | Yasutani et al. |
| 8,485,620 | B2 | 7/2013 | Kitabatake et al. |
| 8,511,787 | B2 | 8/2013 | Yasutani et al. |
| 8,651,616 | B2 | 2/2014 | Maru et al. |
| 8,671,880 | B2 | 3/2014 | Oshio et al. |
| 8,727,519 | B2 | 5/2014 | Nakagawa et al. |
| 8,845,060 | B2 | 9/2014 | Azuma et al. |
| 8,876,280 | B2 | 11/2014 | Ishikawa et al. |
| 8,915,579 | B2 | 12/2014 | Hamasaki et al. |
| 8,950,844 | B2 | 2/2015 | Takahashi et al. |
| 9,004,640 | B2 | 4/2015 | Ishikawa et al. |
| 9,278,552 | B2 | 3/2016 | Teshigawara et al. |
| 9,415,960 | B2 | 8/2016 | Asano et al. |
| 9,434,196 | B2 | 9/2016 | Fukasawa et al. |
| 9,457,590 | B2 | 10/2016 | Koizumi et al. |
| 9,649,851 | B2 | 5/2017 | Fukasawa |
| 9,707,772 | B2 | 7/2017 | Nishiyama |
| 9,975,340 | B2 | 5/2018 | Karita et al. |
| 9,994,040 | B2 | 6/2018 | Karita et al. |
| 10,850,529 | B2 | 12/2020 | Nakano et al. |
| 10,946,666 | B2 | 3/2021 | Ezumi et al. |
| 11,358,387 | B2 | 6/2022 | Fukasawa et al. |
| 11,780,224 | B2 * | 10/2023 | Fukasawa .............. B41J 2/0451 347/17 |
| 2006/0132554 | A1 | 6/2006 | Ota et al. |
| 2008/0273064 | A1 | 11/2008 | Ota et al. |
| 2011/0032296 | A1 | 2/2011 | Nakano et al. |
| 2011/0249062 | A1 | 10/2011 | Nakano et al. |
| 2012/0062651 | A1 | 3/2012 | Takahashi et al. |
| 2016/0089896 | A1 | 3/2016 | Nishiyama |
| 2017/0197417 | A1 | 7/2017 | Karita et al. |
| 2017/0239956 | A1 | 8/2017 | Karita et al. |
| 2017/0297344 | A1 | 10/2017 | Ibe et al. |
| 2018/0111383 | A1 | 4/2018 | Ferrari |
| 2020/0108597 | A1 | 4/2020 | Oikawa et al. |
| 2021/0039400 | A1 | 2/2021 | Nakano et al. |
| 2021/0060927 | A1 | 3/2021 | Oikawa et al. |
| 2021/0070040 | A1 | 3/2021 | Iwasaki et al. |
| 2021/0162768 | A1 | 6/2021 | Ezumi et al. |

FOREIGN PATENT DOCUMENTS

| | | | |
|---|---|---|---|
| JP | 2010-046853 | A | 3/2010 |
| JP | 2011-068013 | A | 4/2011 |
| JP | 2011-068083 | A | 4/2011 |
| JP | 2016-068338 | A | 5/2016 |
| JP | 2017-121784 | A | 7/2017 |
| JP | 2017-148999 | A | 8/2017 |

OTHER PUBLICATIONS

Dec. 10, 2019 International Search Report in International Patent Appln. No. PCT/JP2019/036656.

Oct. 4, 2022 Japanese Official Action in Japanese Patent Appln. No. 2018-189663.

* cited by examiner

| Tmin[sec] | | HUMIDITY | | |
|---|---|---|---|---|
| | | ~30% | 30~60% | 60%~ |
| TEMPERATURE | ~15°C | - | - | - |
| | 15~25°C | 5 | 5 | 3 |
| | 25~35°C | 5 | 5 | 5 |
| | 35°C | 7 | 5 | 5 |

FIG.9A

| Tadd[sec] | | HUMIDITY | | |
|---|---|---|---|---|
| | | ~30% | 30~60% | 60%~ |
| TEMPERATURE | ~15°C | - | - | - |
| | 15~25°C | 4 | 4 | 3 |
| | 25~35°C | 5 | 4 | 4 |
| | 35°C | 5 | 5 | 5 |

FIG.9B

| VALUE TO BE ADDED TO OR SUBTRACTED FROM N | | Tc[sec] | | | | | |
|---|---|---|---|---|---|---|---|
| | | ~5 | 5~10 | 10~15 | 15~20 | 20~25 | 30~ |
| TEMPERATURE | ~15°C | 0 | 0 | 0 | 0 | 0 | -99 |
| | 15~25°C | 1 | 0 | -1 | -2 | -3 | -99 |
| | 25~35°C | 2 | 1 | 0 | -1 | -2 | -99 |
| | 35°C | 3 | 2 | 1 | 0 | -1 | -99 |

※N IS DEEMED TO BE "0" IF N TURNS INTO NEGATIVE

FIG.11

| ENVIRONMENTAL TEMPERATURE [°C] | $\alpha$ [°C] |
|---|---|
| BELOW 20 | 10 |
| EQUAL TO OR ABOVE 20 AND BELOW 25 | 7 |
| EQUAL TO OR ABOVE 30 | 4 |

FIG.16

| PRINTING OPERATION PERIOD [SECONDS] | Tx [SECONDS] |
|---|---|
| EQUAL TO OR ABOVE 30 AND BELOW 60 | 30 |
| EQUAL TO OR ABOVE 60 AND BELOW 100 | 45 |
| EQUAL TO OR ABOVE 100 AND BELOW 180 | 60 |
| EQUAL TO OR ABOVE 180 AND BELOW 300 | 75 |
| EQUAL TO OR ABOVE 300 | 90 |

FIG.19

PRINTING APPARATUS

CROSS-REFERENCE TO RELATED APPLICATIONS

This application is a continuation of U.S. patent application Ser. No. 17/744,825 filed May 16, 2022, which is a continuation of U.S. patent application Ser. No. 17/204,972 filed Mar. 18, 2021, U.S. Pat. No. 11,358,387 B2, which is a Continuation of International Patent Application No. PCT/JP2019/036656, filed Sep. 19, 2019, which claims the benefit of Japanese Patent Applications No. 2018-189633, and 2018-189663 filed Oct. 5, 2018, both of which are hereby incorporated by reference herein in their entirety.

BACKGROUND OF THE INVENTION

Field of the Invention

The present invention relates to a printing apparatus.

Background Art

There is an inkjet printing apparatus adopting an ink circulation system that circulates an ink in a pressure chamber communicating with a discharge port for discharging the ink. PTL 1 discloses a technique for a printing apparatus adopting such an ink circulation system, which is configured to start circulation of an ink immediately before image formation is started and to terminate the circulation of the ink upon completion of the image formation.

In the inkjet printing apparatus configured to circulate the ink during conduct of a printing operation and to terminate the circulation in a case where the printing operation is completed as in the technique according to PTL 1, circulation time varies depending on contents of jobs. For this reason, circulating operations in short periods will be repeated in a case of repeatedly inputting jobs each of which involves a printing operation to be completed in a short time, for example. If the circulating operations in short periods are repeated, circulation may be carried out insufficiently in each circulating operation and a thickened ink generated around a discharge port may be circulated incompletely in some cases. For this reason, repetition of the circulating operations in short periods may gradually accumulate the thickened ink generated around the discharge port and may block normal discharge.

CITATION LIST

Patent Literature

PTL 1: Japanese Patent Laid-Open No. 2017-121784

SUMMARY OF THE INVENTION

A printing apparatus according to an aspect of this disclosure provides an inkjet printing apparatus including: a print head including a discharge port configured to discharge liquid and a pressure chamber to be filled with the liquid to be discharged from the discharge port, and configured to perform a printing operation by discharging the liquid from the discharge port based on print data; a circulation unit configured to perform circulation of the liquid in a circulation passage including the pressure chamber in a state where the printing operation is performed; and a control unit configured to control the circulation unit to continue the circulation for a predetermined time after the printing operation is completed.

Further features of the present invention will become apparent from the following description of exemplary embodiments with reference to the attached drawings.

BRIEF DESCRIPTION OF THE DRAWINGS

FIGS. 9A and 9B are diagrams showing table information;

FIG. 11 is a diagram showing table information;

FIG. 16 is a diagram showing a relation between an environmental temperature and a value a;

FIG. 19 is a diagram showing a relation between the printing operation period and a waiting period.

DESCRIPTION OF THE EMBODIMENTS

Embodiments of the present invention will be described below with reference to the drawings. It is to be noted that the following embodiments are not intended to limit the present invention, and that a solution of the present invention does not always require the entire combination of the features described in the embodiments. The same constituents will be described by denoting the same reference signs. Moreover, relative positions, shapes, and the like of constituents described in the embodiments are merely exemplary and are not intended to limit the scope of the invention exclusively thereto.

First Embodiment

Figure 1:
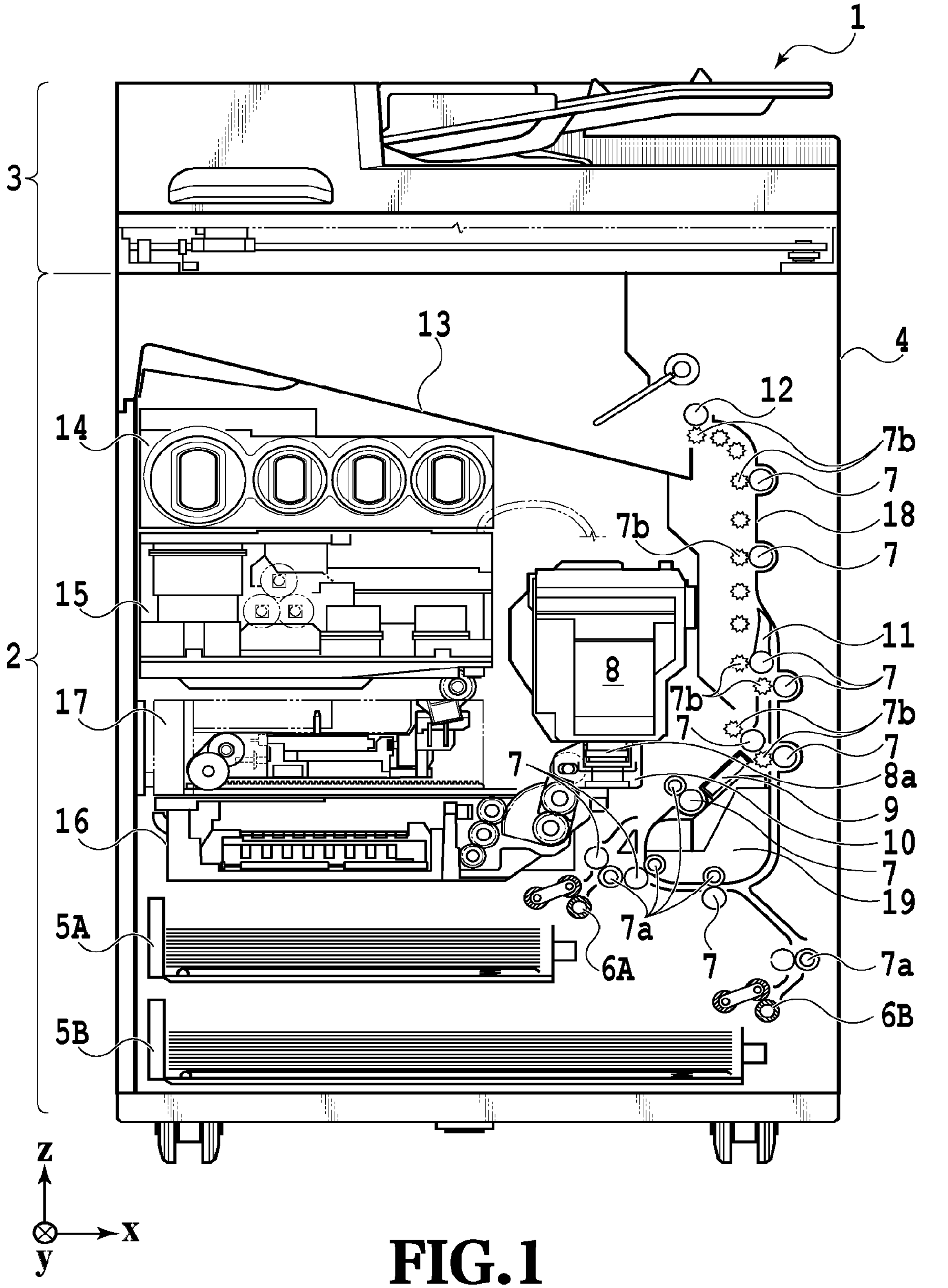
FIG. 1 is a diagram showing a printing apparatus in a standby state.

FIG. 1 is an internal configuration diagram of an inkjet printing apparatus 1 (hereinafter a printing apparatus 1) used in this embodiment. In FIG. 1, x direction represents a horizontal direction, y direction (a direction perpendicular to the sheet surface) is a direction of arrangement of discharge ports in a print head 8 to be described later, and z direction represents a vertical direction, respectively.

The printing apparatus 1 is a multifunction peripheral that includes a printing unit 2 and a scanner unit 3, and is capable of executing a variety of processing concerning a printing operation and a reading operation either by using any one of the printing unit 2 and the scanner unit 3 or by using the printing unit 2 in conjunction with the scanner unit 3. The scanner unit 3 includes an ADF (auto document feeder) and an FBS (flat bed scanner), and is capable of reading a document which is automatically fed by using the ADF and of reading (scanning) the document that a user places on a platen of the FBS. Although this embodiment discusses the multifunction peripheral provided with both the printing unit 2 and the scanner unit 3, an aspect not provided with the scanner unit 3 is also acceptable. FIG. 1 shows the printing apparatus 1 in a standby state of performing neither a printing operation nor a reading operation.

In the printing unit 2, a first cassette 5A and a second cassette 5B for containing print media (cut sheets) S are detachably installed at a bottom part located vertically below a housing 4. The first cassette 5A contains relatively small print media up to A4 size in a stacked manner while the second cassette 5B contains relatively large print media up to A3 size in a stacked manner. A first feeding unit 6A is provided in the vicinity of the first cassette 5A in order to separate and feed the print media contained in the first cassette 5A one by one. Likewise, a second feeding unit 6B is provided in the vicinity of the second cassette 5B. In the case where the printing operation takes place, the print media S are fed selectively from one of the cassettes.

Conveyance rollers 7, an ejection roller 12, pinch rollers 7*a*, spur rollers 7*b*, a guide 18, an inner guide 19, and a flapper 11 constitute a conveyance mechanism for guiding the print media S in a prescribed direction. The conveyance rollers 7 are driving rollers which are provided on an upstream side and a downstream side of the print head 8 and are driven by a not-illustrated conveyance motor. The pinch rollers 7*a* are driven rollers that are rotated while nipping the print media S in conjunction with the conveyance rollers 7. The ejection roller 12 is a driving roller which is provided on a downstream side of the conveyance rollers 7 and is driven by the not-illustrated conveyance motor. The spur rollers 7*b* convey the print media S while nipping the print media S in conjunction with the conveyance rollers 7 and the ejection roller 12 located on the downstream side of the print head 8.

The guide 18 is provided on a conveyance passage for the print media S and guides the print media S in a prescribed direction. The inner guide 19 is a member extending in the y direction and having a curved side surface, which guides the print media S along the side surface. The flapper 11 is a member for switching the direction of conveyance of each print medium S in the case of a double-sided printing operation. An ejection tray 13 is a tray for stacking and holding the print media S ejected by the ejection roller 12 after completion of the printing operation.

The print head 8 of this embodiment is a full line type color inkjet print head, in which discharge ports for discharging inks in accordance with print data are arranged in multiple rows along the y direction in FIG. 1 and in an amount corresponding to the widths of the print media S. In other words, the print head 8 is configured to be capable of discharging inks of multiple colors. In a case where the print head 8 is located at a standby position, a discharge port surface 8*a* of the print head 8 is oriented vertically downward and capped with a cap unit 10 as shown in FIG. 1. In the case where a printing operation is carried out, the orientation of the print head 8 is changed by a print controller 202 to be described later in such a way that the discharge port surface 8*a* is opposed to a platen 9. The platen 9 is formed from a flat plate that extends in the y direction, and supports each print medium S from its back surface, which is subjected to the printing operation by the print head 8. A movement of the print head 8 from the standby position to a printing position will be described later in detail.

An ink tank unit 14 stores the inks of four colors to be supplied to the print head 8, respectively. An ink supply unit 15 is provided in the middle of a flow passage that connects the ink tank unit 14 to the print head 8, and adjusts pressures and flow rates of the inks in the print head 8 to appropriate ranges. This embodiment adopts an ink supply system of a circulation type, and the ink supply unit 15 adjusts a pressure of each ink to be supplied to the print head 8 and a flow rate of each ink collected from the print head 8 to appropriate ranges.

A maintenance unit 16 includes the cap unit 10 and a wiping unit 17, and performs a maintenance operation on the print head 8 by activating these units at a prescribed timing.

Figure 2:
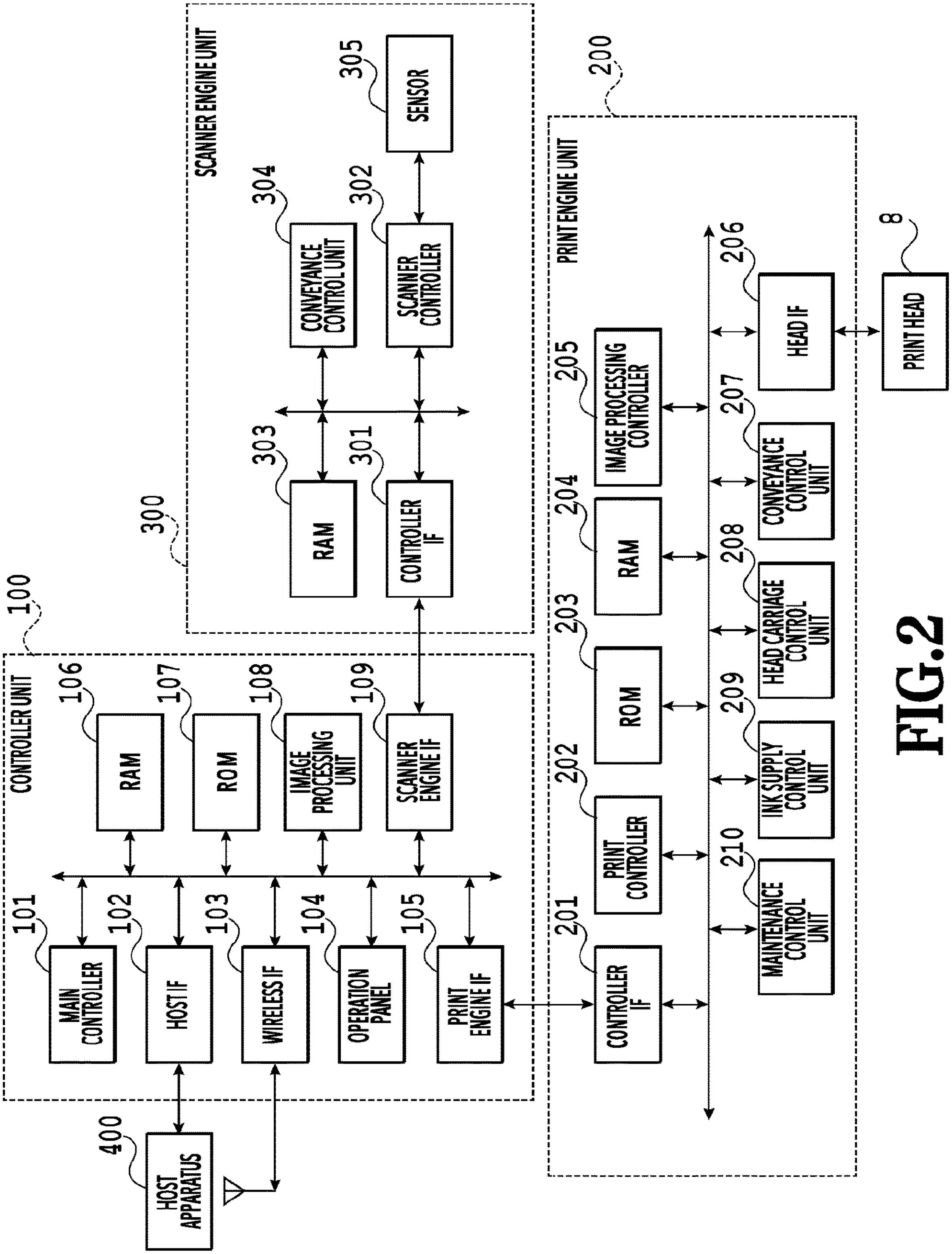
FIG. 2 is a control configuration diagram of the printing apparatus.

FIG. 2 is a block diagram showing a control configuration of the printing apparatus 1. The control configuration is formed mainly from a print engine unit 200 that supervises the printing unit 2, a scanner engine unit 300 that supervises the scanner unit 3, and a controller unit 100 that supervises the entire printing apparatus 1. The print controller 202 controls various mechanisms in the print engine unit 200 in accordance with instructions of a main controller 101 of the controller unit 100. Various mechanisms in the scanner engine unit 300 are controlled by the main controller 101 of the controller unit 100. Details of the control configuration will be described below.

In the controller unit 100, the main controller 101 formed from a CPU controls the entire printing apparatus 1 in accordance with programs and various parameters stored in a ROM 107 while using a RAM 106 as a work area. For example, in a case where a print job is inputted from a host apparatus 400 through a host I/F 102 or a wireless I/F 103, image data received by an image processing unit 108 is subjected to prescribed image processing in accordance with an instruction of the main controller 101. Then, the main controller 101 transmits the image data subjected to the image processing to the print engine unit 200 through a print engine I/F 105.

Here, the printing apparatus 1 may obtain the image data from the host apparatus 400 by way of wireless communication or wired communication, or may obtain the image data from an external storage device (such as a USB memory) connected to the printing apparatus 1. A communication method to be applied to the wireless communication or the wired communication is not limited to a particular method. For example, as the communication method used for the wireless communication, Wi-Fi (Wireless Fidelity) (registered trademark) and Bluetooth (registered trademark) are applicable. Meanwhile, as the communication method used for the wired communication, USB (Universal Serial Bus) and the like are applicable. Meanwhile, as a read command is inputted from the host apparatus 400, for example, the main controller 101 transmits this command to the scanner unit 3 through a scanner engine I/F 109.

An operation panel 104 is a mechanism for allowing a user to perform input and output to and from the printing apparatus 1. The user can instruct an operation such as copying and scanning, set a printing mode, and recognize information on the printing apparatus 1 through the operation panel 104.

In the print engine unit 200, the print controller 202 formed from a CPU controls various mechanisms provided to the printing unit 2 in accordance with programs and various parameters stored in a ROM 203 while using a RAM 204 as a work area. In a case where various commands and the image data are received through a controller I/F 201, the print controller 202 temporarily saves the commands and the image data in the RAM 204. The print controller 202 causes an image processing controller 205 to convert the saved image data into the print data so that the print head 8 can use the image data for the printing operation. As the print data is generated, the print controller 202 causes the print head 8 through a head I/F 206 to execute the printing operation based on the print data. In this instance, the print controller 202 conveys the print media S by driving the feeding units 6A and 6B, the conveyance rollers 7, the ejection roller 12, and the flapper 11 shown in FIG. 1 through a conveyance control unit 207. The printing operation is executed by the print head 8 in conjunction with the conveyance operation on the print media S in accordance with an instruction from the print controller 202, and print processing is thus carried out.

A head carriage control unit 208 changes the orientation and the position of the print head 8 in accordance with an operation state such as a maintenance state and a printing state of the printing apparatus 1. An ink supply control unit 209 controls the ink supply unit 15 such that the pressure of each ink supplied to the print head 8 falls within an appropriate range. A maintenance control unit 210 controls operations of the cap unit 10 and the wiping unit 17 in the maintenance unit 16 in a case of performing a maintenance operation on the print head 8.

In the scanner engine unit 300, the main controller 101 controls hardware resources of a scanner controller 302 in accordance with programs and various parameters stored in the ROM 107 while using the RAM 106 as the work area. Thus, various mechanisms provided to the scanner unit 3 are controlled. For example, the main controller 101 controls the hardware resources in the scanner controller 302 through a controller I/F 301, for example, a document placed on the ADF by the user is conveyed through a conveyance control unit 304 and is read with a sensor 305. Then, the scanner controller 302 saves the image data thus read in a RAM 303. Here, the print controller 202 can cause the print head 8 to execute the printing operation based on the image data read with the scanner controller 302 by converting the obtained image data into the print data as described above.

Figure 3:
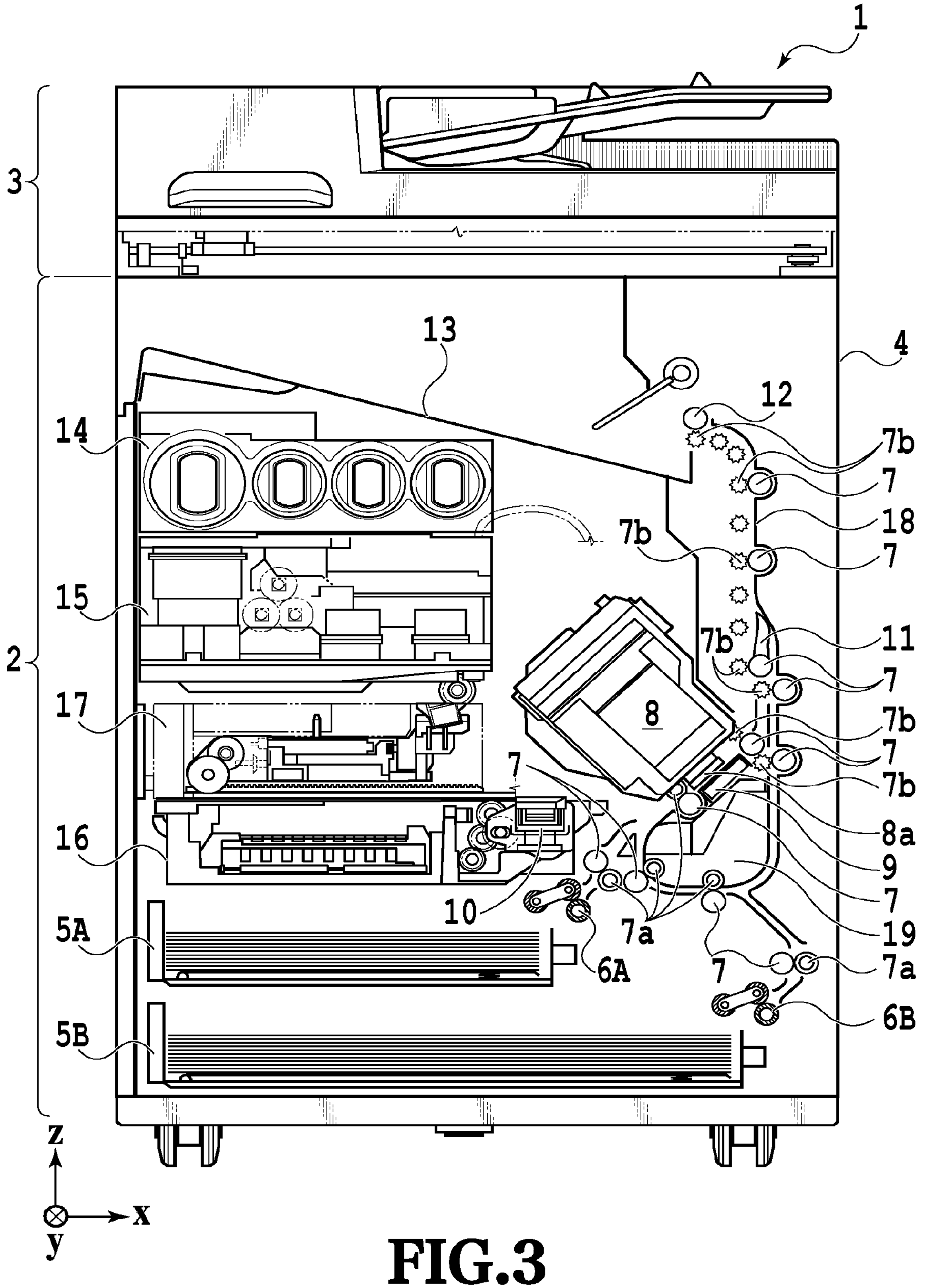
FIG. 3 is a diagram showing the printing apparatus in a printing state.

FIG. 3 shows the printing apparatus 1 in a printing state. As compared to the standby state illustrated in FIG. 1, the cap unit 10 is located away from the discharge port surface 8*a* of the print head 8 and the discharge port surface 8*a* is opposed to the platen 9. In this embodiment, a plane of the platen 9 is inclined by about 45 degrees relative to the horizontal direction, and the discharge port surface 8*a* of the print head 8 at the printing position is also inclined by about 45 degrees relative to the horizontal direction so as to maintain a constant distance from the platen 9.

In the case of moving the print head 8 from the standby position shown in FIG. 1 to the printing position shown in FIG. 3, the print controller 202 moves the cap unit 10 down to an escape position shown in FIG. 3 by using the maintenance control unit 210. Thus, the discharge port surface 8*a* of the print head 8 is located away from a cap member 10*a*. Thereafter, the print controller 202 rotates the print head 8 by 45 degrees while adjusting its height in the vertical direction by using the head carriage control unit 208, thus opposing the discharge port surface 8*a* to the platen 9. In the case of moving the print head 8 from the printing position to the standby position after completion of the printing operation, a reverse operation to the above-described operation is carried out by the print controller 202.

Figure 4:
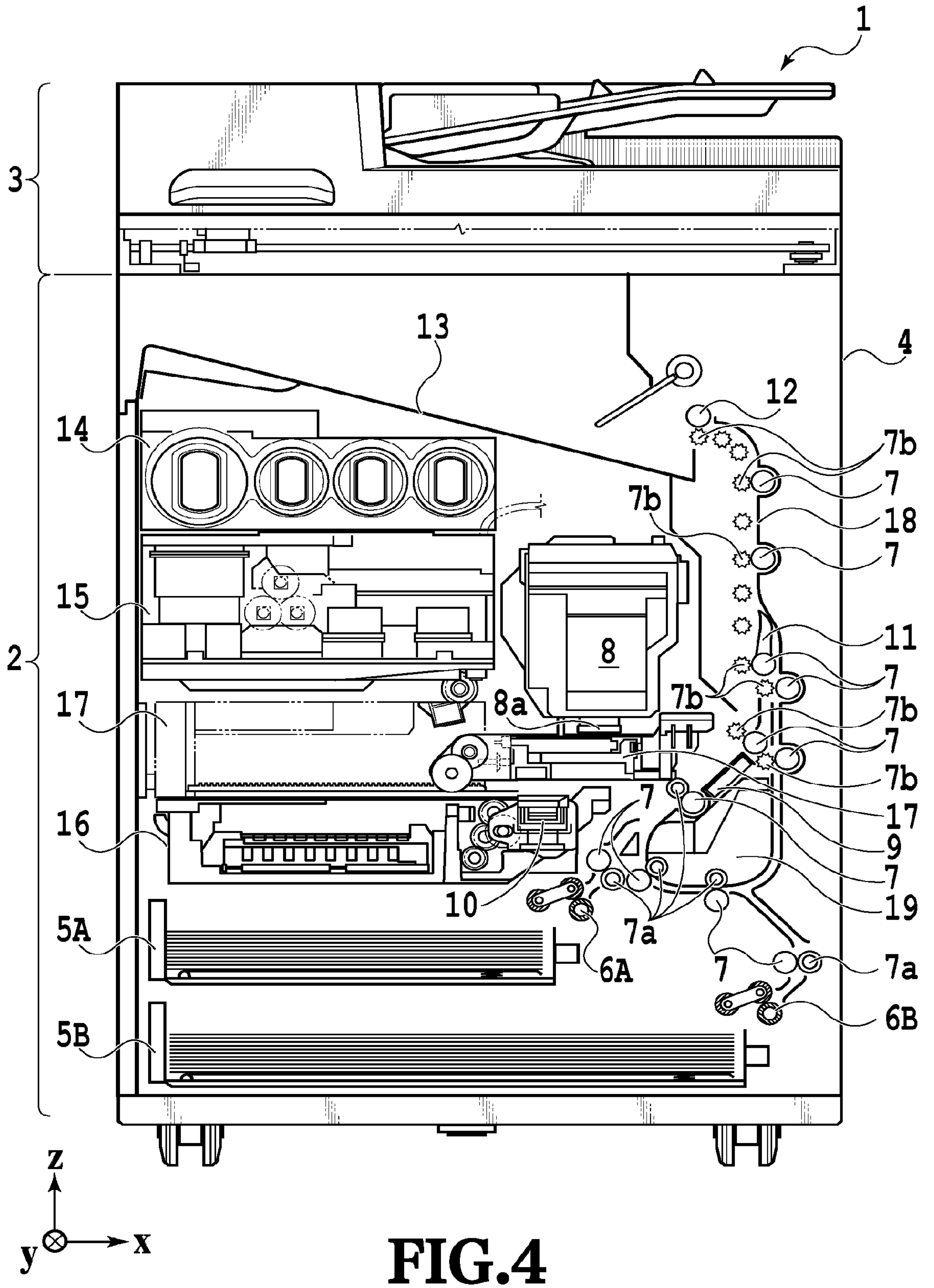
FIG. 4 is a diagram showing the printing apparatus in a maintenance state.

FIG. 4 is a diagram of the printing apparatus 1 in the maintenance state. In the case of moving the print head 8 from the standby position shown in FIG. 1 to a maintenance position shown in FIG. 4, the print controller 202 moves the print head 8 upward in the vertical direction and moves the cap unit 10 downward in the vertical direction. Then, the print controller 202 moves the wiping unit 17 rightward in FIG. 4 from the escape position. Thereafter, the print controller 202 moves the print head 8 downward in the vertical direction to the maintenance position where it is possible to carry out the maintenance operation.

On the other hand, in the case of moving the print head 8 from the printing position shown in FIG. 3 to the maintenance position shown in FIG. 4, the print controller 202 moves the print head 8 upward in the vertical direction while rotating the print head 8 by 45 degrees. Then, the print controller 202 moves the wiping unit 17 rightward from the escape position. Thereafter, the print controller 202 moves the print head 8 downward in the vertical direction to the maintenance position where the maintenance unit 16 can carry out the maintenance operation.

<Ink Supply Unit (Circulation System)>

Figure 5:
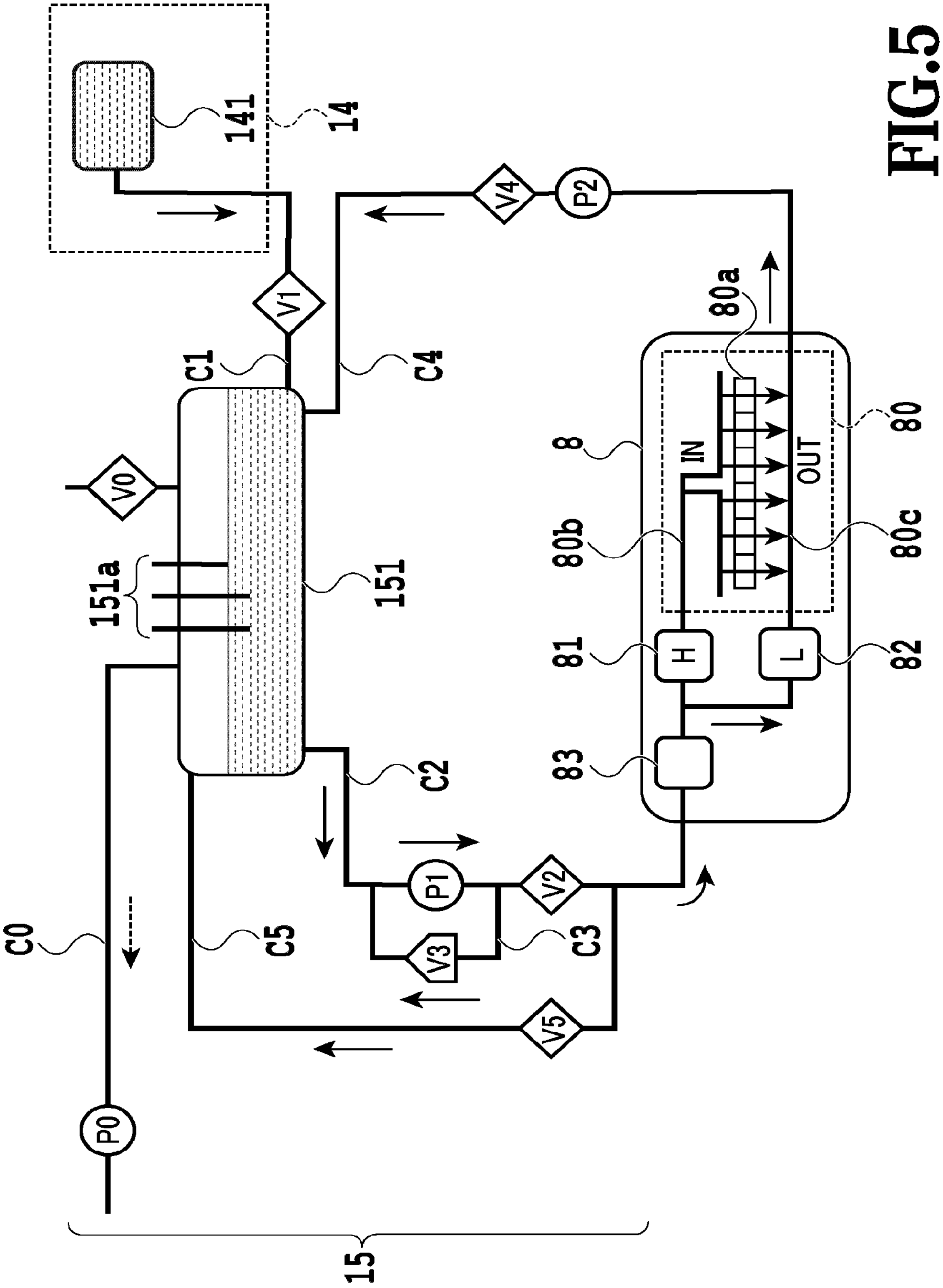
FIG. 5 is a diagram for explaining a flow passage configuration of an ink circulation system.
Figure 6A:
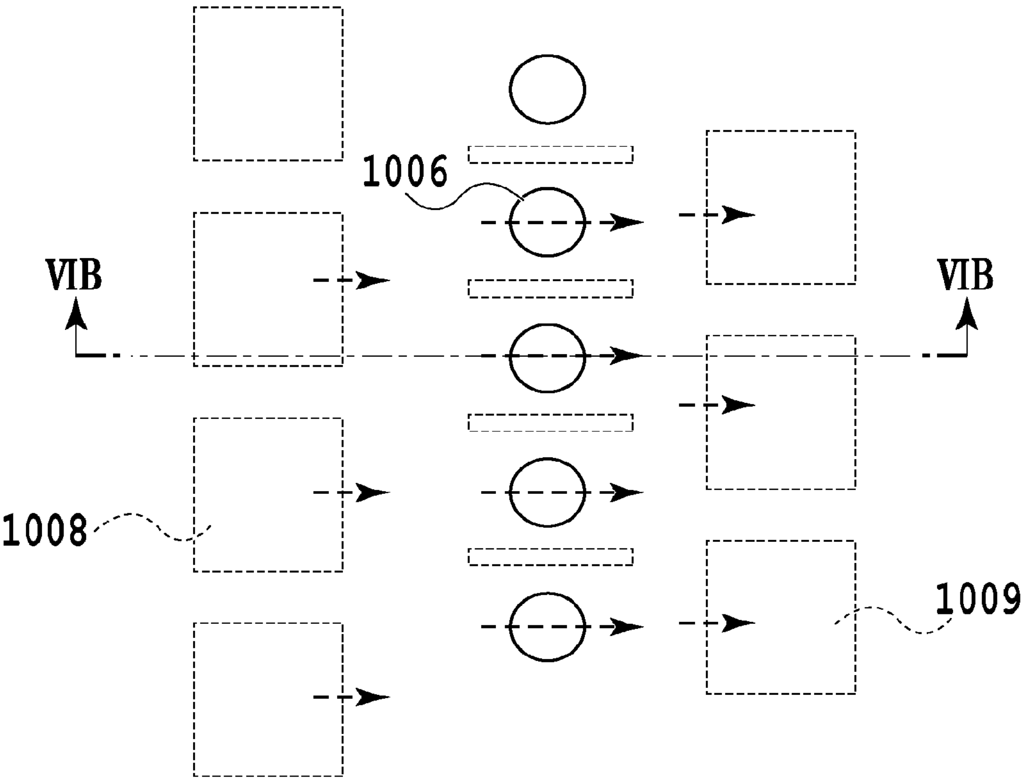
FIGS. 6A and 6B are diagrams for explaining discharge ports and a pressure chamber.
Figure 6B:
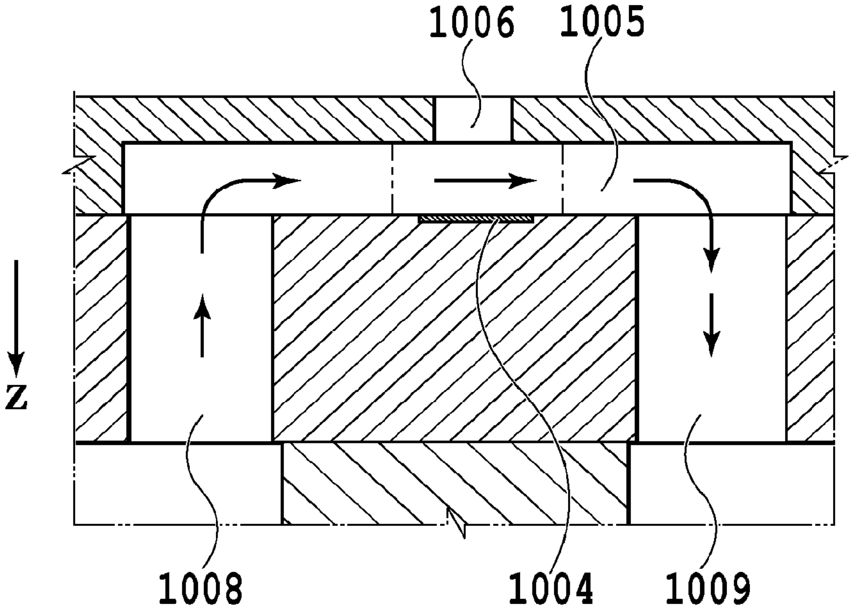

FIG. 5 is a diagram that contains the ink supply unit 15 adopted by the inkjet printing apparatus 1 of this embodiment. A flow passage configuration of the ink circulation system of this embodiment will be described by using FIGS. 6A and 6B. The ink supply unit 15 supplies the ink, which is supplied from the ink tank unit 14, to the print head 8 (a head unit). Although FIGS. 6A and 6B illustrate the configuration for the ink of one of the colors, the same configuration is prepared for each of the inks of the respective colors. The ink supply unit 15 is basically controlled by the ink supply control unit 209 shown in FIG. 2. Now, configurations of the ink supply unit 15 will be described below.

The ink is mainly circulated between a sub tank 151 and the print head 8. In the print head 8, a discharge operation of the ink is carried out based on the image data, and the ink not discharged is collected by the sub tank 151 again.

The sub tank 151 containing a predetermined amount of the ink is connected to a supply flow passage C2 for supplying the ink to the print head 8 and to a collection flow passage C4 for collecting the ink from the print head 8. In other words, a circulation flow passage (a circulation passage) to circulate the ink is formed from the sub tank 151, the supply flow passage C2, the print head 8, and the collection flow passage C4. Meanwhile, the sub tank 151 is connected to a flow passage C0 where air flows.

The sub tank 151 is provided with a liquid surface detection unit 151*a* formed from multiple electrode pins. The ink supply control unit 209 can figure out a height of an ink liquid surface, that is, a remaining amount of the ink in the sub tank 151 by detecting presence or absence of conducting currents among these pins. A decompression pump P0 (an in-tank decompression pump) is a negative pressure generation source for decompressing a tank inner side of the sub tank 151. An air release valve V0 is a valve for switching whether or not to connect the inside of the sub tank 151 to the atmosphere.

A main tank 141 is a tank for containing the ink to be supplied to the sub tank 151. The main tank 141 is formed from a flexible member and the ink is fed into the sub tank 151 by changing the volume of the flexible member. The main tank 141 is configured to be attachable to and detachable from a body of the printing apparatus. A tank supply valve V1 for switching connection of the sub tank 151 to the main tank 141 is provided in the middle of a tank connection flow passage C1 that connects the sub tank 151 to the main tank 141.

In a case where the liquid surface detection unit 151*a* detects that the ink in the sub tank 151 becomes less than a predetermined amount, the ink supply control unit 209 closes the air release valve V0, a supply valve V2, a collection valve V4, and a head replacement valve V5. Meanwhile, the ink supply control unit 209 opens the tank supply valve V1. In this state, the ink supply control unit 209 activates the decompression pump P0. Then, the inside of the sub tank 151 is set to a negative pressure whereby the ink is supplied from the main tank 141 to the sub tank 151. In the case where the liquid surface detection unit 151*a* detects that the ink in the sub tank 151 exceeds the predetermined amount, the ink supply control unit 209 closes the tank supply valve V1 and stops the decompression pump P0.

The supply flow passage C2 is a flow passage for supplying the ink from the sub tank 151 to the print head 8, and a supply pump P1 and the supply valve V2 are provided in the middle thereof. During the printing operation, it is possible to circulate the ink in the circulation flow passage while supplying the ink to the print head 8 by driving the supply pump P1 in the state of opening the supply valve V2. An amount of the ink discharged from the print head 8 per unit time varies depending on the image data. A flow rate of the supply pump P1 is determined to be able to deal with a case of performing a discharge operation in which an amount of ink consumption by the print head 8 per unit time reaches a maximum.

A relief flow passage C3 is a flow passage which is located upstream of the supply valve V2 and connects an upstream side of the supply pump P1 to a downstream side thereof. A relief valve V3 serving as a differential pressure regulating valve is provided in the middle of the relief flow passage C3. The relief valve is not opened or closed by a driving mechanism, but the valve is biased with a spring and configured to be opened at the time of reaching a predetermined pressure. For example, in a case where an amount of ink supply from the supply pump P1 per unit time is larger than a sum of the amount of discharge of the print head 8 per unit time and a flow rate (an amount of drawing the ink) of a collection pump P2 per unit time, the relief valve V3 is opened in response to a pressure acting on itself. Thus, a circuit flow passage is formed from part of the supply flow passage C2 and from the relief flow passage C3. By providing the configuration of the relief flow passage C3, the amount of ink supply to the print head 8 is adjusted in accordance with the amount of ink consumption by the print head 8, so that the pressure inside the circulation passage can be stabilized irrespective of the image data.

The collection flow passage C4 is a flow passage for collecting the ink from the print head 8 to the sub tank 151, and the collection pump P2 and the collection valve V4 are provided in the middle thereof. The collection pump P2 serves as a negative pressure generation source and suctions the ink from the print head 8 in the case where the ink is circulated in the circulation passage. As a consequence of driving the collection pump P2, an appropriate difference in pressure is generated between an IN flow passage 80*b* and an OUT flow passage 80*c* in the print head 8, so that the ink can be circulated between the IN flow passage 80*b* and the OUT flow passage 80*c*.

The collection valve V4 also serves as a valve for preventing a backflow in the case of not carrying out the printing operation, that is, in the case of not circulating the ink in the circulation passage. In the circulation passage of this embodiment, the sub tank 151 is disposed vertically above the print head 8 (see FIG. 1). For this reason, in the case where the supply pump P1 or the collection pump P2 is not driven, the ink may flow backward from the sub tank 151 to the print head 8 due to a water head difference between the sub tank 151 and the print head 8. To avoid such a backflow, the collection flow passage C4 is provided with the collection valve V4 in this embodiment.

Note that the supply valve V2 also functions as a valve for avoiding the supply of the ink from the sub tank 151 to the print head 8 in the case of not carrying out the printing operation, that is, in the case of not circulating the ink in the circulation passage.

A head replacement flow passage C5 is a flow passage that connects the supply flow passage C2 to an air chamber (a space that does not contain the ink) of the sub tank 151 and the head replacement valve V5 is provided in the middle thereof. One end of the head replacement flow passage C5 is connected to a portion of the supply flow passage C2 located upstream of the print head 8 and downstream of the supply valve V2. Another end of the head replacement flow passage C5 is connected to an upper part of the sub tank 151 to communicate with the air chamber inside the sub tank 151. The head replacement flow passage C5 is used in a case of draining the ink off the print head 8 such as replacement of the print head 8 and transportation of the printing apparatus 1. The ink supply control unit 209 controls the head replacement valve V5 in such a way as to be closed except in a case of filling the print head 8 with the ink or in a case of collecting the ink from the print head 8.

Next, a flow passage configuration inside the print head 8 will be described. The ink supplied from the supply flow passage C2 to the print head 8 is passed through a filter 83, and is then supplied to a first negative pressure control unit 81 and to a second negative pressure control unit 82. A control pressure in the first negative pressure control unit 81 is set to a weak negative pressure (a negative pressure having a small difference in pressure from an atmospheric pressure). A control pressure in the second negative pressure control unit 82 is set to a strong negative pressure (a negative pressure having a large difference in pressure from the atmospheric pressure). Each of the pressures in the first negative pressure control unit 81 and the second negative pressure control unit 82 is generated in an appropriate range by driving the collection pump P2.

Multiple print element boards 80*a* each including an array of discharge ports are arranged on an ink discharge unit 80, thus forming elongate discharge port arrays. A common supply flow passage 80*b* (the IN flow passage) for guiding the ink supplied from the first negative pressure control unit 81 and a common collection flow passage 80*c* (the OUT flow passage) for guiding the ink supplied from the second negative pressure control unit 82 also extend in the direction of arrangement of the print element boards 80*a*. In addition, each print element board 80*a* is provided with an individual supply flow passage connected to the common supply flow passage 80*b* and an individual collection flow passage connected to the common collection flow passage 80*c*. Accordingly, a flow of the ink in such a way as to flow in from the common supply flow passage 80*b* having the relatively weak negative pressure and to flow out to the common collection flow passage 80*c* having the relatively strong negative pressure is generated in each print element board 80*a*. Pressure chambers communicating with the respective discharge ports and being filled with the ink are provided on a route from the individual supply passages to the individual collection passages, and the flow of the ink is also generated in the discharge ports and the pressure chambers not performing the printing. In the case where the discharge operation takes place on the print element board 80*a*, part of the ink moving from the common supply flow passage 80*b* to the common collection flow passage 80*c* is consumed by being discharged from the discharge ports. Meanwhile, the ink not discharged moves to the collection flow passage C4 through the common collection flow passage 80*c*.

FIG. 6A is a schematic plan view showing an enlarged part of the print element board 80*a* and FIG. 6B is a schematic cross-sectional view taken along the cross-sectional line VIb-VIb in FIG. 6A. The print element board 80*a* is provided with a pressure chamber 1005 to be filled with the ink and discharge ports 1006 that discharge the ink. In the pressure chamber 1005, a print element 1004 is provided at a position opposed to each discharge port 1006. Meanwhile, the print element board 80*a* is provided with individual supply flow passages 1008 connected to the common supply flow passage 80*b* and individual collection flow passages 1009 connected to the common collection flow passage 80*c*, which are formed corresponding to the respective discharge ports 1006.

According to the configuration described above, the flow of the ink that flows in from the common supply flow passage 80*b* having the relatively weak negative pressure (having a large absolute value of the pressure) and flows out to the common collection flow passage 80*c* having the relatively strong negative pressure (having a small absolute value of the pressure) is generated in the print element board 80*a*. To be more precise, the ink flows in the order of the common supply flow passage 80*b*→the individual supply flow passage 1008→the pressure chamber 1005→the individual collection flow passage 1009→the common collection flow passage 80*c*. In the case where the ink is discharged by the print element 1004, part of the ink moving from the common supply flow passage 80*b* to the common collection flow passage 80*c* is discharged from the discharge port 1006 and is thus ejected out of the print head 8. On the other hand, the ink not discharged from the discharge port 1006 is collected by the collection flow passage C4 through the common collection flow passage 80*c*.

In the case of performing the printing operation under the configuration mentioned above, the ink supply control unit 209 closes the tank supply valve V1 and the head replacement valve V5, opens the air release valve V0, the supply valve V2, and the collection valve V4, and drives the supply pump P1 and the collection pump P2. In this way, the circulation passage in the order of the sub tank 151→the supply flow passage C2→the print head 8→the collection flow passage C4→the sub tank 151 is established. In the case where the amount of ink supply from the supply pump P1 per unit time is larger than the sum of the amount of discharge of the print head 8 per unit time and the flow rate of the collection pump P2 per unit time, the ink flows from the supply flow passage C2 into the relief flow passage C3. Thus, the flow rate of the ink flowing from the supply flow passage C2 into the print head 8 is adjusted.

In the case where the printing operation does not take place, the ink supply control unit 209 stops the supply pump P1 and the collection pump P2, and closes the air release valve V0, the supply valve V2, and the collection valve V4. In this way, the flow of the ink inside the print head 8 is stopped and the reverse flow due to the water head difference between the sub tank 151 and the print head 8 is also suppressed. Moreover, a leakage of the ink or evaporation of the ink from the sub tank 151 is also suppressed by closing the air release valve V0.

<Explanation of Thickened Ink>

Figure 7A:
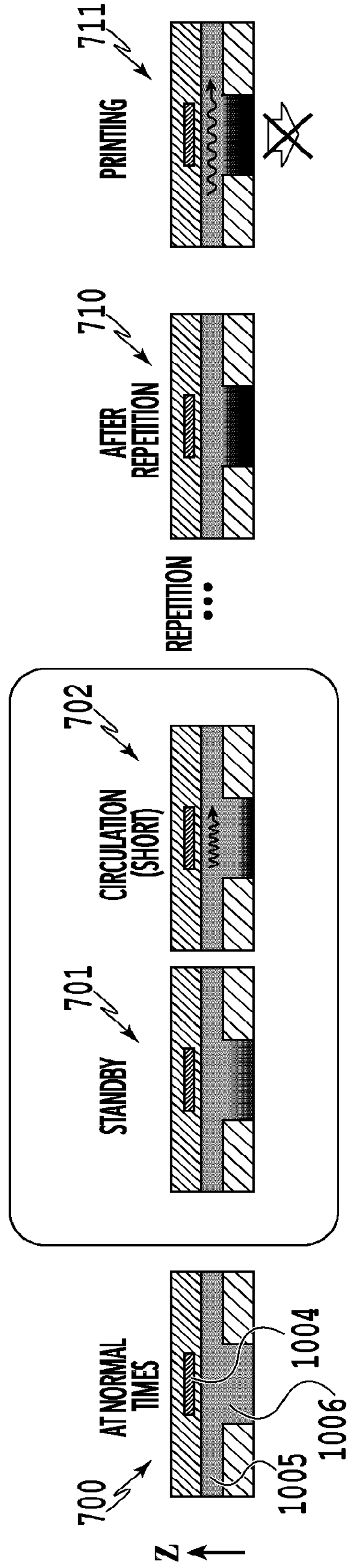
FIGS. 7A and 7B are diagrams for explaining an aspect of generation of a thickened ink.
Figure 7B:
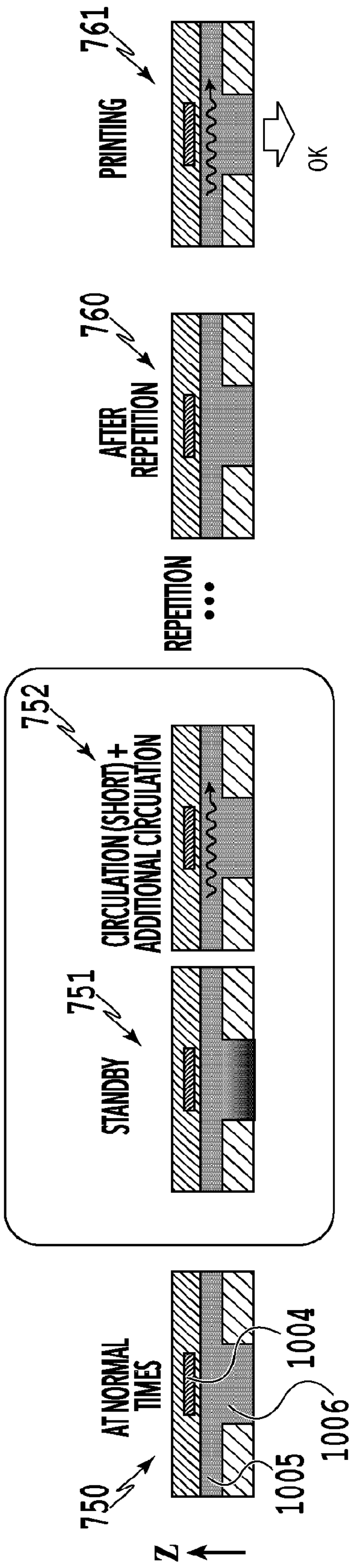

FIGS. 7A and 7B are diagrams for explaining an aspect of generation of a thickened ink. As with FIG. 6B, FIGS. 7A and 7B are diagrams showing a cross-section in the vicinity of the discharge port 1006. Note that FIGS. 7A and 7B are illustrated upside down as compared to FIG. 6B. FIG. 7A is a diagram that explains a case of repeating circulation in a short time as a comparative example. FIG. 7B is a diagram explaining an outline of processing in this embodiment. In FIGS. 7A and 7B, a timeline is assumed to transition from the left to the right in the drawings.

First, a description will be given by using the comparative example of FIG. 7A. As mentioned above, in this embodiment, the circulation of the ink is started in this embodiment in the case where the printing operation takes place. Then, the circulation of the ink is terminated in the case where the printing operation is completed. A status 700 shows a state at normal times without generation of a thickened ink. A status 701 shows a state in the case where the printing operation does not take place, or in other word, a standby state where the circulation of the ink is terminated. In the status 701, the ink inside the discharge port 1006 begins to get thickened gradually from a portion in contact with the air. This is due to a change in property of the ink in the vicinity of the discharge port 1006 caused by evaporation of a volatile component of the ink inside the discharge port 1006 into the air.

Thereafter, the circulation of the ink is started as the printing operation takes place. As the ink is circulated, the flow of the ink also occurs in the pressure chamber 1005 and in the vicinity of the discharge port 1006. The ink in the vicinity of the discharge port 1006 which begins to get thickened is dispersed into the flow passage by this flow of the ink. Thus, it is possible to prevent the thickened ink from being accumulated in the vicinity of the discharge port 1006.

Here, in the case where the printing operating is completed in a short time, a circulating operation of the ink is also terminated in a short time in conformity to printing time. A status 702 shows a state in the vicinity of the discharge port 1006 in the case of carrying out the circulating operation in a short time. As shown in the status 702, the increase in thickness of the ink in the vicinity of the discharge port 1006 cannot be completely eliminated in the case of carrying out the circulating operation in the short time.

A status 710 shows a state in the vicinity of the discharge port 1006 after repeatedly carrying out the above-mentioned circulating operations in the short time. The thickened ink is accumulated in the vicinity of the discharge port 1006 and then the thickened ink is fixed to the discharge port 1006. A status 711 shows an aspect in which the ink cannot be discharged normally despite an attempt to discharge the ink in the printing operation in the fixed state of the ink as mentioned above.

FIG. 7B shows an aspect in the vicinity of the discharge port 1006 in the case of carrying out the processing of this embodiment. As with the status 700, a status 750 shows a state at normal times without generation of a thickened ink. As with the status 701, a status 751 shows a standby state where circulation of the ink is terminated. In the status 751, the ink inside the discharge port 1006 gradually begins to get thickened as with the status 701.

As with the status 702, a status 752 shows the case where the printing operation is completed in a short time. However, in this embodiment, processing to extend the circulating operation is carried out for a predetermined time period in addition to original circulation time (time to circulate corresponding to the printing operation) in the case where the printing operation is completed in the short time. Accordingly, as shown in the status 752, the thickened ink in the vicinity of the discharge port 1006 is dispersed into the flow passage whereby the increase in thickness of the ink in the vicinity of the discharge port 1006 is eliminated.

A status 760 shows a state in the vicinity of the discharge port 1006 after repeatedly carrying out the operations each including the circulating operation for the short time followed by the circulating operation for the predetermined time period. In a status 761, no thickened ink is accumulated in the vicinity of the discharge port 1006. Accordingly, the ink is discharged normally from the discharge port 1006 in the case of carrying out the printing operation in the status 761. Note that the operation extending the circulating operation for the predetermined time period is assumed to be carried out for the ink of each color.

<Flowchart>

Figure 8A:
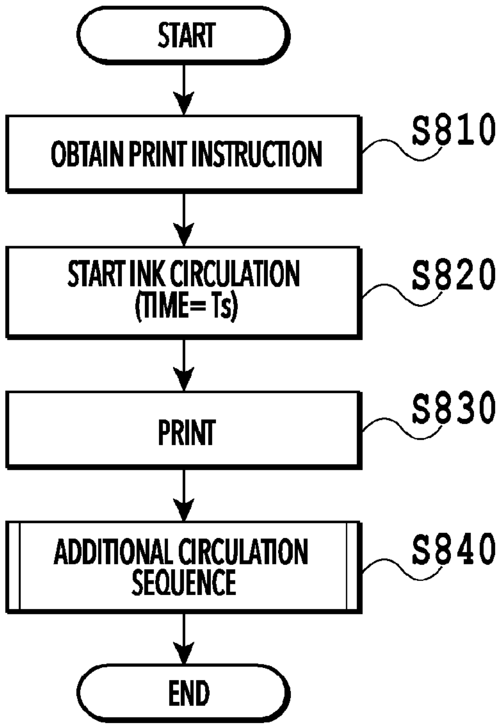
FIGS. 8A and 8B are flowcharts in a case of carrying out a printing operation.
Figure 8B:
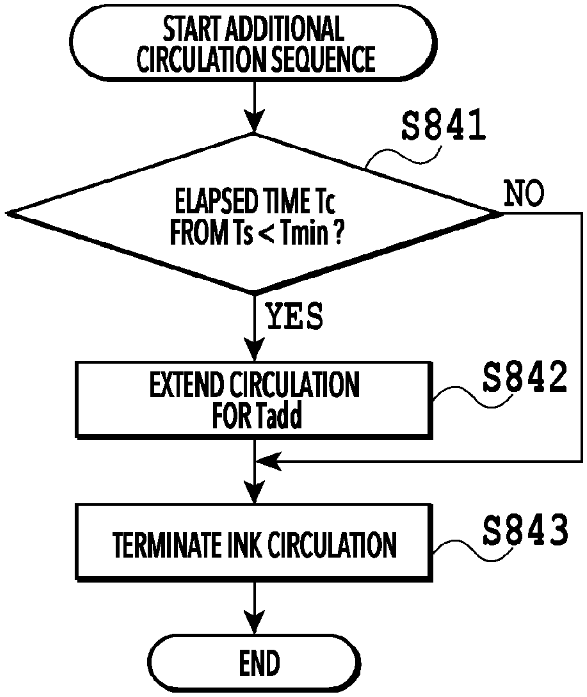

FIGS. 8A and 8B are diagrams showing flowcharts in the case of carrying out the printing operation in this embodiment. A series of processing shown in FIGS. 8A and 8B is carried out by allowing the print controller 202 to load program codes stored in the ROM 203 into the RAM 204 and to execute the program codes. Alternatively, functions of part or all of the steps in FIGS. 8A and 8B may be implemented by hardware such as an ASIC and an electronic circuit. Note that sign "S" in the explanations in respective procedures of the processing means a step in the flowchart.

FIG. 8A is a flowchart showing the entire processing. In S810, the print controller 202 obtains a print instruction. For example, the print controller 202 obtains the print instruction by receiving the print instruction corresponding to a print job from the main controller 101.

In S820, the print controller 202 starts circulation of the ink by controlling the ink supply control unit 209. Meanwhile, the print controller 202 saves ink circulation start time Ts in the RAM 204.

In S830, the print controller 202 carries out the printing operation by controlling the image processing controller 205, the conveyance control unit 207, and the head carriage control unit 208. In the case where the print job includes an instruction to print on ten print media, for example, the printing operation on the ten print media is carried out in S830. In the case where the print job includes an instruction to print on five print media, the printing operation on the five print media is carried out in S830. The processing proceeds to S840 in the case where the printing operation is completed.

In S840, the print controller 202 carries out an additional circulation sequence. The additional circulation sequence is processing to perform the circulation additionally in the case of the short circulation time. As described earlier, the circulating operation of the ink is extended as long as the printing operation is carried out in S830. The circulation time of the ink may vary depending on the time of the printing operation. In the meantime, the time of the printing operation may vary depending on the print job inputted by the user. In short, the circulation time corresponding to the printing operation cannot be uniquely determined on the printing apparatus 1 side. For this reason, the processing to extend the circulation in accordance with the circulation time is carried out in this embodiment as described later.

FIG. 8B is a flowchart to explain details of the additional circulation sequence in S840. In S841, the print controller 202 obtains elapsed time Tc from the ink circulation start time Ts in S820. The elapsed time Tc represents elapsed time of the circulation carried out in one printing operation (a printing operation to be carried out in response to one print job). In other words, the elapsed time Tc is the time corresponding to the time of the print operation in S830. The print controller 202 determines whether or not the elapsed time Tc from the ink circulation start time Ts falls below a defined value Tmin. The processing proceeds to S842 in the case where the elapsed time Tc falls below the defined value Tmin. The processing proceeds to S843 while skipping S842 in the case where the elapsed time Tc is equal to or above the defined value Tmin.

In S842, the print controller 202 extends the circulation for time Tadd. Values of the defined value Tmin and the time to extend the circulation (also referred to as additional circulation time) Tadd can be set as appropriate. In one example, the defined value Tmin can be set to 5 seconds and the additional circulation time Tadd can be set to 4 seconds. According to the processing in S842, the circulation will be extended for the time Tadd in the case where the printing operation has the short time that falls below the defined value Tmin. As a consequence, the increase in thickness of the ink in the vicinity of the discharge port 1006 can be eliminated as shown in the status 752 in FIG. 7B. Thereafter, the processing proceeds to S843.

In S843, the print controller 202 terminates the circulation of the ink. Then, the print controller 202 terminates the processing. In the case where the elapsed time Tc from the ink circulation start time Ts is equal to or above the defined value Tmin, the increase in thickness of the ink in the vicinity of the discharge port 1006 is assumed to have been sufficiently eliminated. Accordingly, no additional operation to extend the circulation is carried out.

As described above, in this embodiment, the circulation time is extended in the case where the circulation time for one session at the time of the print operation falls below the prescribed time. This makes it possible to suppress the accumulation of the thickened ink and to avoid a failure to discharge the ink normally due to the fixation.

<Modified Examples>

Though the first embodiment has described the mode of carrying out the processing of the additional circulation sequence shown in FIGS. 8A and 8B for the ink of each color as the example, the present invention is not limited only to this mode. The processing of the additional circulation sequence may be carried out only on a specified ink instead. For example, it is known that an ink that contains a large amount of a pigment is prone to be thickened. For example, a black ink is used as an ink that contains a large amount of a pigment. In this case, only the black ink may be regarded as a target for the additional circulation sequence in S840.

An aspect in which the printing apparatus 1 is provided with a mode of circulating only the black ink and a mode of circulating all colors including the black ink is assumed as an example. The mode of circulating only the black ink is selected in a case where the print instruction obtained in S810 of FIG. 8A is an instruction based on a monochrome printing job. The mode of circulating all colors including the black ink is selected in a case where the print instruction obtained in S810 of FIG. 8A is an instruction based on a color printing job. The print instruction obtained in S810 is selected in the case of the instruction based on the color printing job. In the case of being operated in the mode of circulating only the black ink, the print controller 202 only needs to extend the circulation time exactly for the time Tadd in S842 of FIG. 8B. In the case of being operated in the mode of circulating all the colors including the black ink, the print controller 202 only needs to switch the mode to the mode of circulating only the black ink and to extend the circulation time exactly for the time Tadd in S842.

Meanwhile, an aspect of individually carrying out the circulation control depending on the colors may be adopted instead. In this aspect, in the case where the circulation of the inks of the colors at least including the black ink is carried out, only the circulation time for the black ink may be extended in S842.

Here, the ink that is prone to be thickened has been described as the example of the case of extending the circulation time only for the specified ink. However, the present invention is not limited only to this example. For instance, the circulation time may be extended regarding an ink that is discharged by using a discharge port having characteristics such as a shape of the discharge port, which is more likely to increase the thickness as compared to other ink discharge ports.

Note that a case of obtaining the next print instruction while extending the circulation time is also presumable. In this case, it is possible to carry out the processing again from the procedure in S810 onward after terminating the additional circulation sequence in S840. In this case, the previous ink circulation start time Ts may be continuously used in S820 without clearing this time.

Second Embodiment

The first embodiment has described the example in which the defined value Tmin and the additional circulation time Tadd are the predetermined fixed values. This embodiment will describe an example in which the defined value Tmin and the additional circulation time Tadd are values that are variable depending on an installation environment of the printing apparatus 1.

The printing apparatus 1 of this embodiment is configured to be capable of obtaining at least one of a temperature and a humidity under an environment where the printing apparatus 1 is set up. For example, the printing apparatus 1 includes a thermometer and a hygrometer, and the print controller 202 obtains the temperature and the humidity measured with the thermometer and the hygrometer. Alternatively, the printing apparatus 1 may be configured to be capable of obtaining the information on the temperature and the humidity from a different apparatus. In the meantime, the temperature and the humidity do not have to be measured values, and values estimated in accordance given methods may be used instead.

FIGS. 9A and 9B are diagrams showing an example of table information to be referred to by the print controller 202 in this embodiment. FIG. 9A shows the table information concerning the defined value Tmin while FIG. 9B shows the table information concerning the additional circulation time Tadd. The print controller 202 obtains at least one of the temperature and the humidity, and sets the defined value Tmin and the additional circulation time Tadd to values defined for an item corresponding to the temperature or the humidity thus obtained. For example, in the case where the temperature is 20° C. and the humidity is 65%, the defined value Tmin is set to 3 seconds and the additional circulation time is set to 3 seconds. In the case where the temperature is 36° C. and the humidity is 25%, the defined value Tmin is set to 7 seconds and the additional circulation time is set to 5 seconds. Here, the values of the defined value Tmin and the additional circulation time Tadd corresponding to the temperature or the humidity can be set at a given timing as appropriate. For example, the print controller 202 may change the set values every time the print controller 202 starts the additional circulation sequence in S840 of FIGS. 8A and 8B, or may set the values of the defined value Tmin and the additional circulation time Tadd by obtaining the temperature or the humidity once in every predetermined period.

Here, the increase in thickness of the ink is prone to progress more as the temperature is higher or the humidity is lower. For this reason, as shown in FIGS. 9A and 9B, it is preferable to set both the defined value Tmin and the additional circulation time Tadd longer as the temperature is higher or the humidity is lower.

By setting the defined value Tmin and the additional circulation time Tadd to variable values by using the information on the installation environment of the printing apparatus 1 as described above, it is possible to suppress the increase in thickness of the ink more appropriately. In addition, it is possible to reduce power consumption by not carrying out the circulation more than is needed.

Third Embodiment

The first embodiment and the second embodiment have described the mode of extending the circulation time in the case where the circulation time for one operation falls below the predetermined time period. In other words, these embodiments have described the mode of extending the circulation time every time of circulation in the case of repeating the short time circulations, in which the circulation time for each operation falls below the predetermined time period. This embodiment will describe an aspect in which the number of times of repeating the short time circulation is counted and the circulation time is extended in the case where the counted value reaches a predetermined value. In this embodiment, the occurrence of an increase in thickness of the ink to a certain degree is predictable. Accordingly, it is preferable to set a longer time period for the additional circulation time as compared to the time described in conjunction with the first embodiment.

Figure 10:
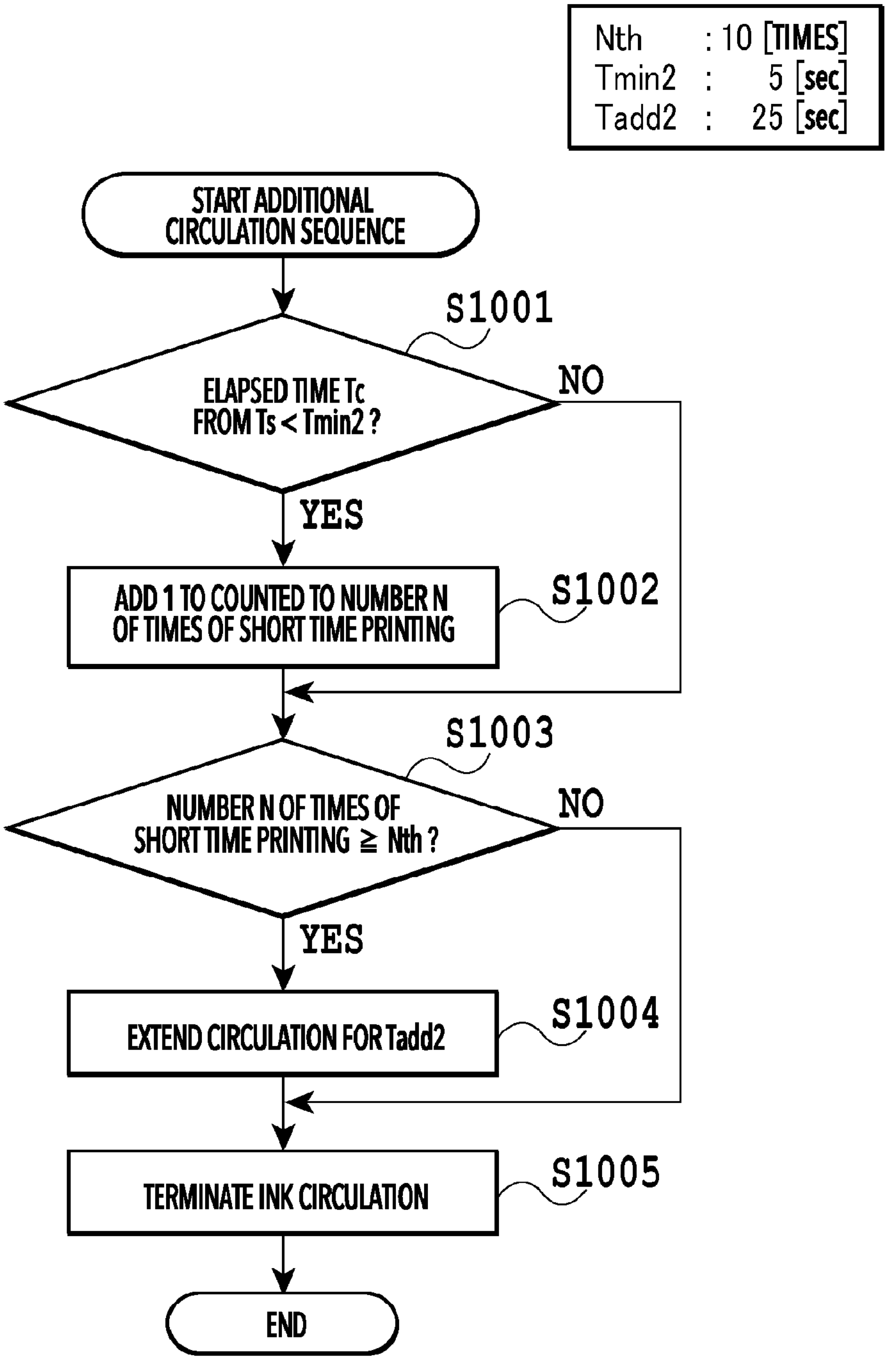
FIG. 10 is a diagram for explaining an additional circulation sequence.

FIG. 10 is a flowchart that explains the additional circulation sequence in this embodiment. FIG. 10 is a diagram that shows detailed processing in S840 of FIG. 8A.

In S1001, the print controller 202 obtains the elapsed time Tc from the ink circulation start time Ts. As with the first embodiment, the elapsed time Tc represents extended time of the circulation carried out in one printing operation (a printing operation to be carried out in response to one print job). The print controller 202 determines whether or not the elapsed time Tc from the ink circulation start time Ts falls below a defined value Tmin2. The processing proceeds to S1002 in the case where the elapsed time Tc falls below the defined value Tmin2. The processing proceeds to S1003 while skipping S1002 in the case where the elapsed time Tc is equal to or above the defined value Tmin2. The defined value Tmin2 is set to 5 seconds, for example.

In S1002, the print controller 202 adds 1 to a counted value N that indicates the number of times of short time printing. Then, the processing proceeds to S1003. In other words, in this embodiment, the circulation is not immediately extended even in the case where the elapsed time Tc from the ink circulation start time Ts falls below the defined value Tmin2.

In S1003, the print controller 202 determines whether or not the counted value N is equal to or above a predetermined value Nth. The predetermined value Nth is defined as 10 times, for example. The processing proceeds to S1004 in the case where the counted value N is equal to or above the predetermined value Nth. In the case where the counted value N is not equal to or above the predetermined value Nth, the processing proceeds to S1005 while skipping S1004.

In S1004, the print controller 202 extends the circulation for a time period Tadd2. The additional circulation time Tadd2 is set to 25 seconds, for example. Thereafter, the processing proceeds to S1005.

In S1005, the print controller 202 terminates the circulation of the ink.

According to the above-described processing, even in the case of repeating the short time circulations each having the circulation time for one operation below the predetermined time period, the circulation is extended for the period of the additional circulation time Tadd2 in the case where the number of times of the short time circulations reaches the predetermined number of times. Accordingly, it is possible to suppress the increase in thickness of the ink.

Here, as described above, the circulation time associated with the printing operation may vary depending on the print instruction and the short time circulations are not always repeated. For example, there is a case where a long time circulating operation may be carried out after repeating the short time circulations several times. In this case, the increase in thickness of the ink is eliminated by the long time circulating operation. Accordingly, in the case where a circulating operation equal to or longer than a second time period is carried out, the print controller 202 may update the counted value with a lower value than the current value or perform control to reset the counted value, for example. The second time period may be defined as the defined value Tmin2+the additional circulation time Tadd2, for example.

Meanwhile, in a case where a cleaning operation (such as preliminary discharge) having a larger effect to eliminate the increase in thickness of the ink in the vicinity of the discharge port 1006 than the circulating operation is carried out, the print controller 202 may perform control to reset the counted value.

<Modified Examples>

The flowchart of FIG. 10 has described the example in which the value to be added to the counted value N in the processing of S1002 is set to the fixed value “1”. However, the present invention is not limited only to this example. The value used for updating the counted value N may be a negative value or may be a variable value instead of the fixed value. The counted value N may be updated by performing addition or subtraction while using a value weighted in accordance with the elapsed time Tc from the ink circulation start time Ts (that is, the circulation time associated with the printing operation). For example, a larger value may be added to the counted value N as the elapsed time Tc (the circulation time) is shorter, or a larger value may be subtracted from the counted value N as the elapsed time Tc (the circulation time) is longer.

Meanwhile, as described in the second embodiment, the value to be added to or subtracted from the counted value may be changed depending on the temperature or the humidity. FIG. 11 is a diagram showing an example of table information used in this embodiment. FIG. 11 demonstrates examples of values to be added or subtracted, which correspond to the elapsed time Tc (the circulation time) and the temperature. In the case where the elapsed time Tc is long as shown in FIG. 11, the values to be added may be smaller and the values to be subtracted may be larger than those in the case where the elapsed time Tc is short. In this modified example, the print controller 202 may replace the processing in S1002 with processing to update the counted value N by using a value obtained by referring to the table information in FIG. 11. Here, if the counted value becomes negative, then the counted value may be set to “0” and treated virtually as a reset value. While FIG. 11 illustrates the examples of the values to be added and subtracted corresponding to the elapsed time Tc (the circulation time) and the temperature, values to be added and subtracted corresponding to the elapsed time Tc (the circulation time) and the temperature as well as the humidity may be held and used as the table information instead.

Fourth Embodiment

This embodiment describes an aspect in which an operation to cap the print head 8 with the cap unit 10 after completion of the printing operation requires time equal to or above a predetermined time period. As described earlier, the printing apparatus 1 is in the state where the cap unit 10 is in contact with the discharge port surface 8*a* of the print head 8 whereby the cap unit 10 protects the discharge port surface 8*a* at the time of standby. Moreover, in the case where the printing is started, the cap unit 10 is moved away from the discharge port surface 8*a* (which will be referred to as cap opening) and the ink is discharged from the discharge port surface 8*a*. Then, as the printing is completed, the cap unit 10 comes into contact with the discharge port surface 8*a* to cap the discharge port surface 8*a* (which will be referred to as cap closing).

In this embodiment, it is assumed that this cap closing operation requires 5 seconds, for example. In other words, this embodiment is assumed to be the aspect in which the time corresponding to the additional circulation time Tadd as described in the first embodiment is required for the cap closing operation. In the meantime, once the cap closing operation is started in this embodiment, the cap closing is assumed to be done without being interrupted in mid-course. In this case, once the cap closing operation is started, it is not possible to start the printing operation (that is, to perform cap opening) for a predetermined time period until the cap closing operation is completed. Accordingly, by extending the circulation time in accordance with the predetermined time period required for the cap closing operation, it is possible to suppress the increase in thickness of the ink without causing additional time associated with extension of the circulation.

Figure 12:
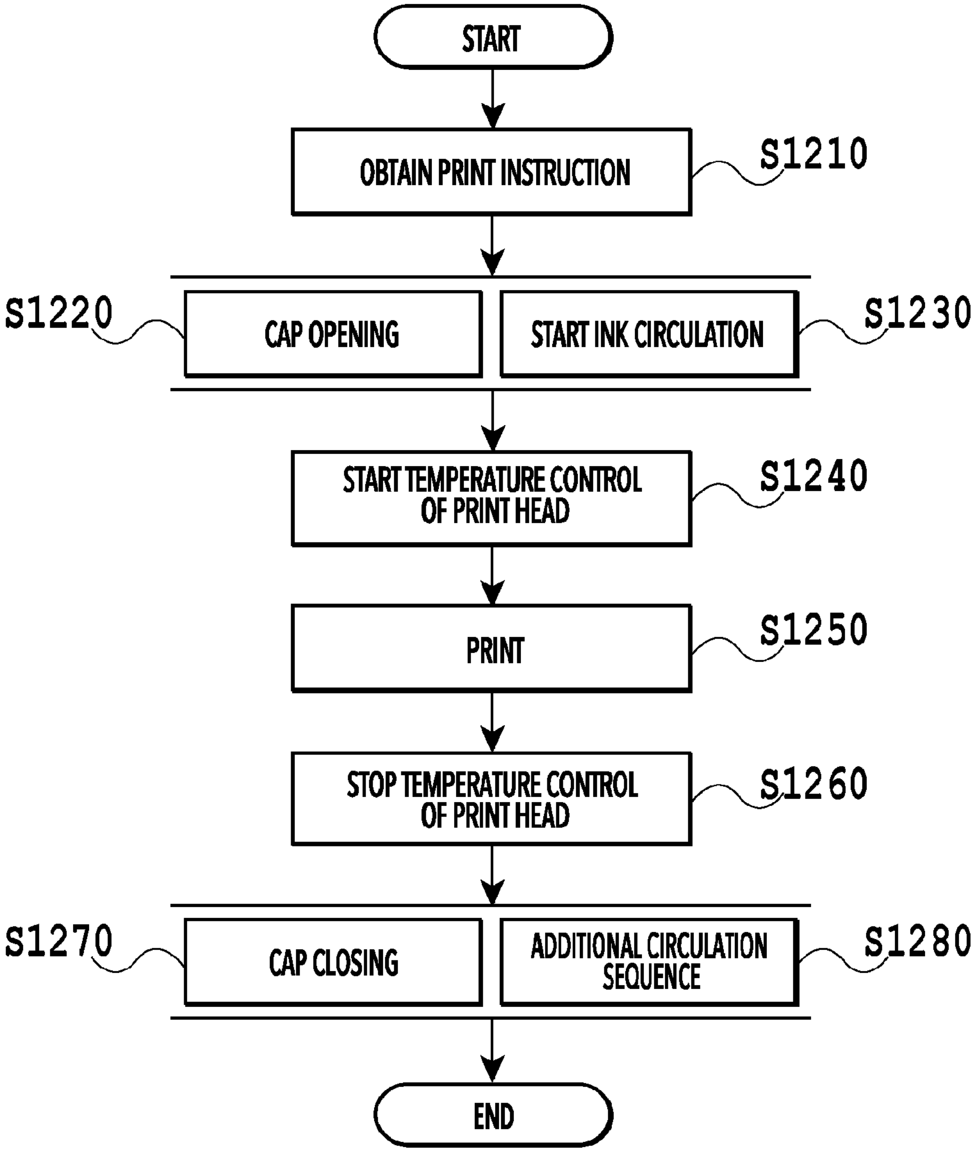
FIG. 12 is a flowchart in a case of carrying out the printing operation.

FIG. 12 is a diagram showing a flowchart of this embodiment. In S1210, the print controller 202 obtains the print instruction. In S1220, the print controller 202 carries out the cap opening operation. Meanwhile, in S1230, the print controller 202 starts the circulation of the ink. The procedures in S1220 and S1230 are carried out in parallel.

In S1240, the print controller 202 starts temperature adjustment of the print head 8. The print element board 80*a* of this embodiment is provided with a heater 113 (see FIG. 13) separately from the print elements 1004. Moreover, the processing to adjust the temperature of the ink in the print head 8 is carried out by heating either the print head 8 or the ink in the print head 8 to by using the heater so that the ink can be stably discharged from the discharge ports 1006 at the time of printing.

In S1250, the print controller 202 carries out the printing operation. In the case where the printing operation is completed, the print controller 202 stops the temperature adjustment of the print head 8 in S1260. Here, if the temperature adjustment of the print head 8 is carried out in the state where the circulation is terminated, evaporation of moisture from the discharge ports 1006 is promoted whereby the increase in thickness of the ink is accelerated. For this reason, in the case of the aspect to carry out the temperature adjustment of the print head 8, the temperature adjustment of the print head 8 is stopped before the additional circulation sequence to take place thereafter.

Following the procedure in S1260, the print controller 202 carries out the cap closing operation in S1270. Meanwhile, subsequent to the procedure in S1260, the print controller 202 carries out the additional circulation sequence in parallel with S1270.

In the additional circulation sequence in S1270, processing that is similar to the processing described with reference to FIG. 8B is carried out, for example. Note that the defined value Tmin is assumed to be set to an extremely large value such as 9999 seconds while the additional circulation time Tadd is assumed to be set to 5 seconds in this embodiment. In other words, this embodiment is designed such that the processing proceeds to S842 as a result of the determination in S841. The additional circulation time Tadd corresponds to the time required for the cap closing operation. Alternatively, the additional circulation time Tadd may be shorter than the time required for the cap closing operation.

According to the processing and the settings described above, the circulation time will be extended so as to correspond to the time period for the cap closing operation. As a consequence, it is possible to suppress the increase in thickness of the ink without causing additional time associated with extension of the circulation. Moreover, it is also possible to suppress accumulation of a slight increase in thickness that would be caused during the cap closing operation.

Here, since the defined value Tmin is set the extremely large value in this embodiment, the additional circulation sequence may take place without carrying out the processing to determine the defined value Tmin in S841, or in other words, regardless of the circulation time. This configuration is particularly effective in a case of using the ink that is prone to a failure to be discharged normally during discontinuation of the circulation or in a case where the cap closing operation takes some time.

This embodiment has described the aspect of carrying out both of the processing of the cap opening operation and the processing of the cap closing operation and the processing of the temperature adjustment of the print head 8 as the example. However, it is also possible to adopt an aspect of carrying out one of the two types of processing mentioned above.

An aspect obtained by combining any of the above-described embodiments with a different embodiment or a modified example may also be adopted. For example, the processing of the flowchart in FIG. 10 described in the third embodiment may be carried out for a specified ink. Meanwhile, the processing described in the first embodiment may be carried out for a specified ink while the processing described in the third embodiment may be carried out for other inks. Here, the processing to be carried out may be transposed. In the meantime, the additional circulation sequence described in the fourth embodiment may be carried out for a specific ink while the processing described in the first to third embodiments may be carried out for other inks.

Fifth Embodiment

This embodiment will describe an aspect in which a print element board in the print head 8 is provided with a heater. This embodiment will also describe an aspect in which the circulating operation is carried out in a case where the temperature of the print head 8 is higher than a prescribed temperature.

Figure 13:
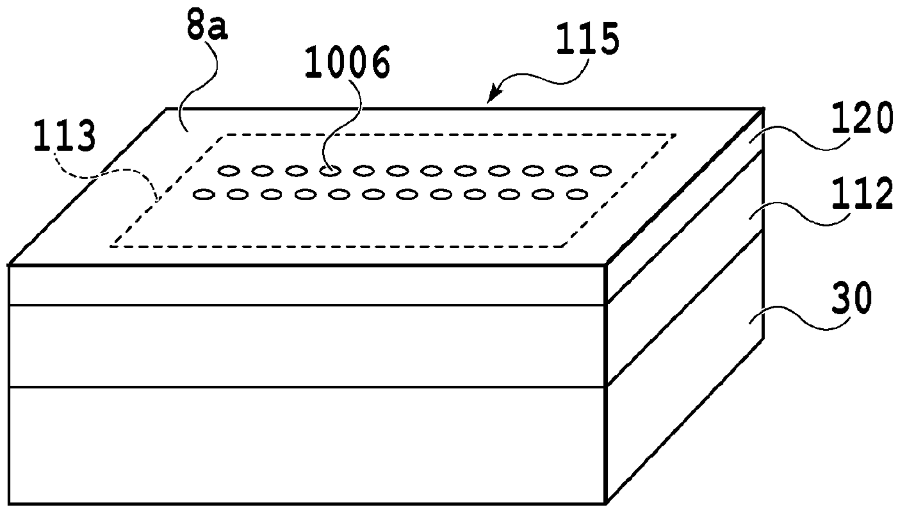
FIG. 13 is a diagram showing a print element board.

FIG. 13 is a perspective view showing a print element board 115 in the print head 8. The print element board 115 includes a substrate 112 and a discharge port forming member 120 which is opposed to the substrate 112 and joined to the substrate 112. The substrate 112 is provided with the print elements 1004 (see FIG. 6B) for discharging the ink. The discharge port forming member 120 is provided with discharge ports 132 as openings on an opposite side to a print medium, and the ink is discharged from the discharge ports to the print medium. Meanwhile, the print element board 115 is provided with the heater 113 being a heating element. The heater 113 will be described later. Note that a surface where the discharge ports 1006 of the discharge port forming member 120 are open (a surface opposed to the print medium) may be referred to as a discharge port forming surface (a discharge port surface) 8*a* in some cases. A support member 30 is a support body that supports the print element board 115, and is also a component that fluidically connects the print element board 115 to a flow passage member that distributes a liquid to the print element board 115. Accordingly, the support member 30 is preferably a member which has a high degree of flatness and can be joined to the print element board with sufficiently high reliability. As for the material, alumina or a resin material is preferable, for example.

<Effect of Heat Accumulation after Long Time Printing Operation>

As shown in FIG. 13, the printing apparatus 1 is provided with the heater 113 for increasing the temperature of the print element board 115. The temperature of the print element board 115 may be increased in the course of discharging the ink in order to achieve high-duty printing to apply a large amount of the ink per unit area. In order to deal with a deterioration in image quality caused by an increase in temperature of the print element board 115, this embodiment is configured to adjust the temperature of the print element board 115 at 40° C. and to maintain this high-temperature state by using the heater 113 at a stage before the printing operation involving the ink discharge. In this way, the increase in temperature of the print element board 115 attributed to the ink discharge is suppressed and the deterioration in image quality is thus prevented.

As mentioned above, the print element board 115 is attached onto the support member 30. The temperature adjustment is conducted by using the heater 113 so as to control the temperature of the print element board 115 at the 40° C. during the printing operation. In order to alleviate the temperature of the print element board 115, the print element board 115 is formed from a material having a relatively high thermal conductivity as compared to other components that constitute the print head 8. The support member 30 in contact with the print element board 115 is made of alumina or the like, which is a component having a lower thermal conductivity than that of the print element board 115. Accordingly, if the printing operation lasts for a long time, the support member 30 in contact with the print element board 115 accumulates heat generated for adjusting the temperature of the print element board 115 or heat from the print elements 1004.

Figure 14A:
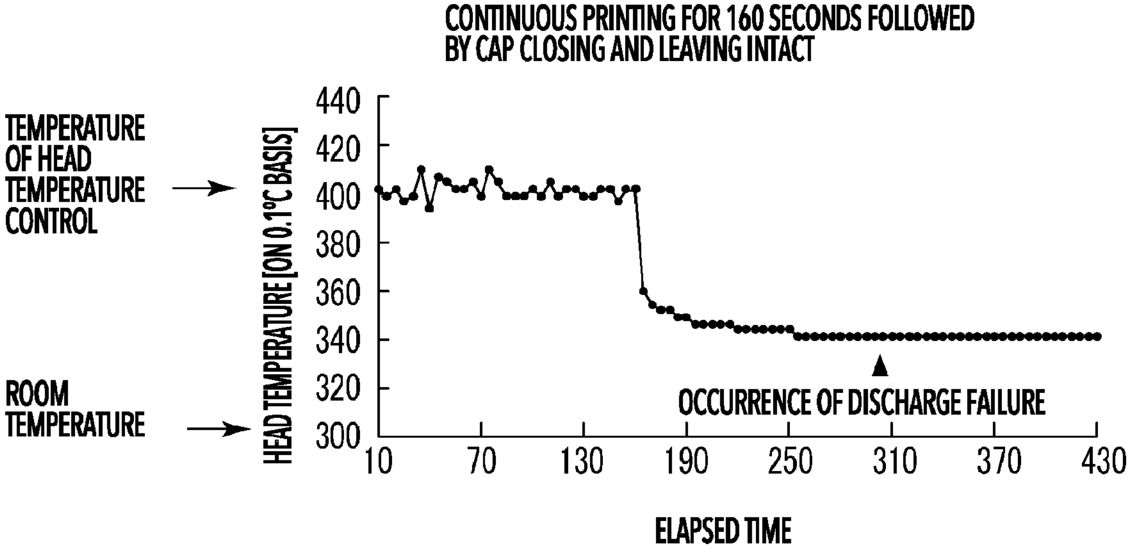
FIGS. 14A and 14B are diagrams showing changes in temperature of a print head along with a printing operation.

FIG. 14A is a graph showing elapsed time and a change in temperature of the print element board 115 in a case where the temperature adjustment is carried out as a comparative example while adjusting the temperature of the print element board 115 in the print head 8 at 40° C. in an environment at a room temperature of 30° C., and the printing operation is continuously carried out for 160 seconds. In this example, the temperature adjustment of the print element board 115 in the print head 8 is terminated at the time of completion of the printing operation. Here, the circulation of the ink is terminated and the discharge port surface 8*a* is closed with the cap. Values on the longitudinal axis of a curve in FIG. 14A from the elapsed time of 160 seconds onward represent a change in temperature of the print element board 115 after completion of the printing operation. It is apparent that the temperature of the print element board 115 is less likely to drop during a period starting from the elapsed time of 160 seconds due to the effect of heat accumulation of the support member 30, and that the temperature of the print element board 115 is maintained at a higher temperature than the room temperature of 30° C. In this state, the moisture in the ink evaporates from each discharge port 1006 and the portion of the ink in the vicinity of the discharge port 1006 increases its thickness. Accordingly, there is a possibility of a discharge failure if the printing operation is carried out within minutes in this state.

Figure 14B:
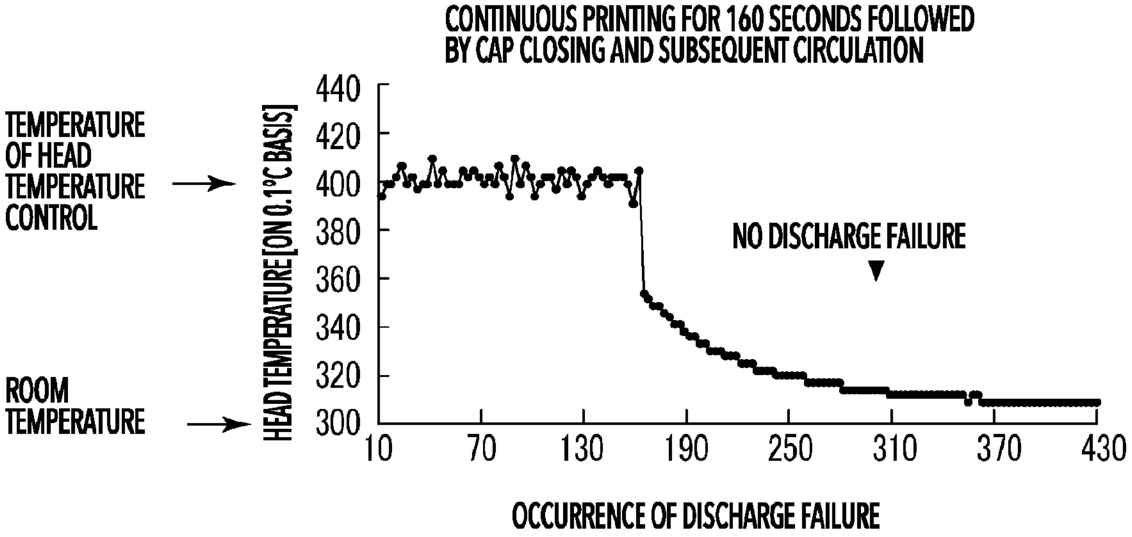

Given the circumstances, this embodiment provides a mode of reducing the temperature of the print element board 115 by circulating the ink in a case where the temperature of the print element board 115 in the print head 8 is higher than a predetermined temperature after completion of the printing operation. FIG. 14B is a graph showing a time change and a change in temperature of the print element board 115 in a case where the printing operation is carried out according to this embodiment under the same conditions as the case in FIG. 14A. Values on the longitudinal axis of a curve in the graph from the elapsed time of 160 seconds onward represent a change in temperature of the print element board 115 after completion of the printing operation. In this embodiment, the ink is circulated on the circulation passage inclusive of the print head 8 even after the completion of the printing operation. Accordingly, it is apparent that there is an effect of cooling the print element board 115 by supplying the ink at room temperature from a supply passage side into the print head 8, and that the temperature of the print element board 115 at the elapsed time of 160 seconds onward is brought closer to the room temperature. As described above, the temperature of the print head 8 is reduced earlier than the comparative example in FIG. 14A. Thus, it is possible to suppress the increase in thickness of the ink due to the evaporation of the ink in the vicinity of the discharge port, and thus to suppress discharge failures of the ink.

<Flowchart>

Figure 15:
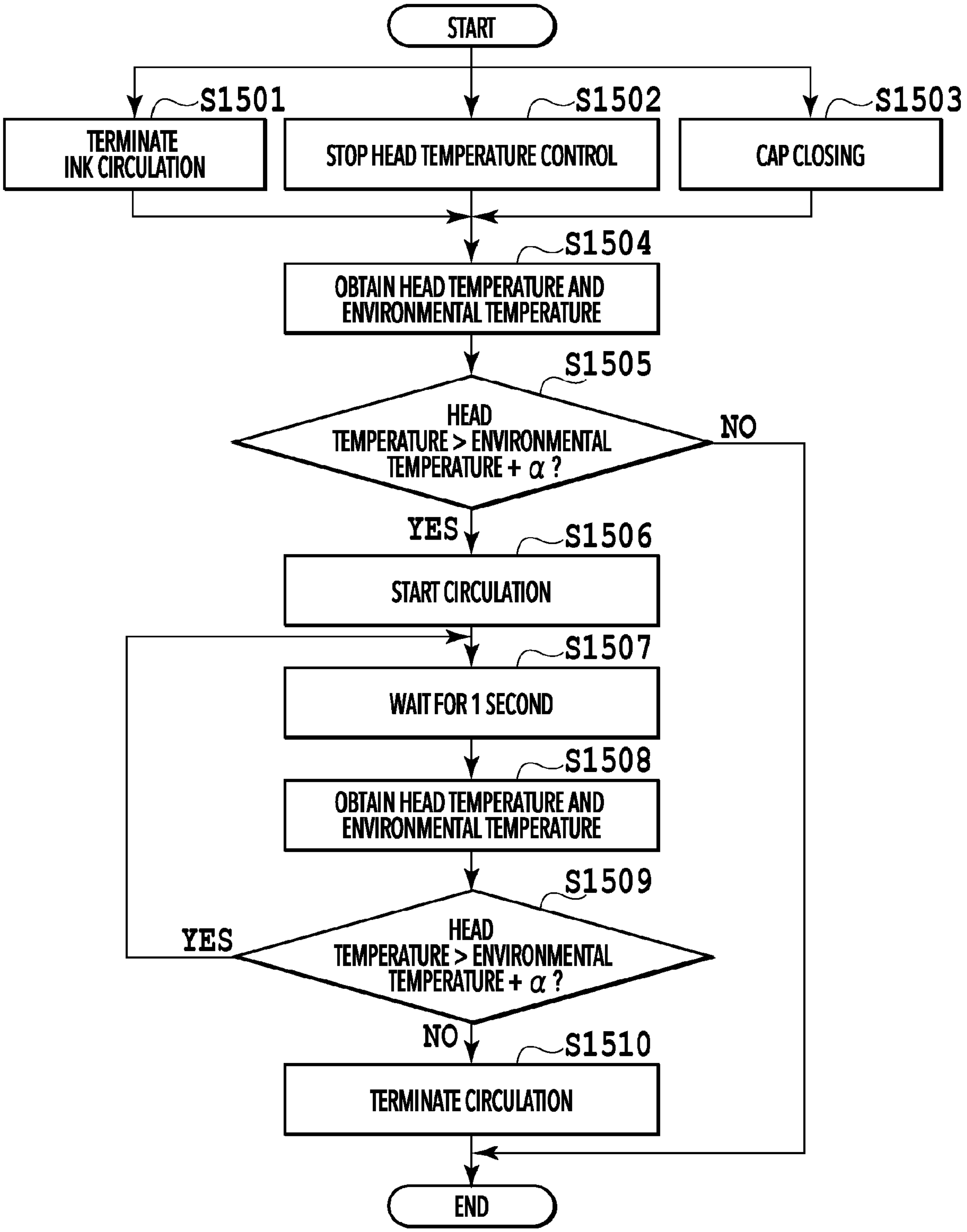
FIG. 15 is a flowchart showing processing to carry out all-color circulation in accordance with a temperature of the print head.

FIG. 15 is a flowchart showing details of processing to carry out the circulation of the ink in order to reduce the temperature of the print head 8 in the case where the temperature of the print head 8 is higher than a predetermined temperature. This flowchart is put into practice after the completion of the printing operation by the print head 8.

In S1501, the print controller 202 terminates the circulation of the ink along with completion of the printing operation. In this embodiment, the ink is circulated on the circulation passage inclusive of the print head 8 during the printing operation. After the completion of the printing operation, the circulation of the ink is terminated at the timing to complete the printing operation in order to prevent condensation of the ink located on the circulation passage.

In S1502, the print controller 202 turns off the heater 113 for heating the print element board 115, thus stopping the temperature control of the print head 8.

In S1503, the print controller 202 brings the cap member 10*a* into contact with the discharge port surface 8*a* of the print head 8 to establish a cap-closed state. After the completion of the printing operation, the procedures in S1501, S1502, and S1503 are carried out in parallel. The processing proceeds to S1504 upon completion of the procedures in S1501, S1502, and S1503.

In S1504, the print controller 202 obtains information on the temperature of the print head 8 and the environmental temperature. The printing apparatus 1 is provided with thermometric sensors (not illustrated) for performing respective temperature measurements of the print element boards 115, so that the print controller 202 can obtain the temperature of each print element board 115 at a desired timing. Each sensor is formed from semiconductor, for example. Here, the sensor detects the temperature by defining a resistance value of the sensor to a result of obtaining the information on the temperature of the print head. In this embodiment, the print controller 202 determines the highest temperature out of the temperatures of the print element boards 115 indicated in the obtained information as the temperature of the print head 8.

Note that the method of determining the temperature of the print head 8 is not limited to the above-described method. The temperature of the print head 8 may be determined by use of a mathematical expression to obtain an average value based on the temperatures of the print element boards 115. Alternatively, the temperature of the print head 8 may be determined by using a temperature of a different component that constitutes the print head 8.

In the meantime, the printing apparatus 1 is provided with a thermometer (not illustrated) for measuring the environmental temperature, so that the print controller 202 can obtain the environmental temperature at a desired timing. A location to install a sensor of the thermometer for measuring the environmental temperature only needs to be a place where it is possible to measure the temperature equivalent to the room temperature at a location of installation of the printing apparatus 1 without being influenced by an increase in temperature inside the printing apparatus 1.

In S1505, the print controller 202 determines whether or not the temperature of the print head 8 thus obtained is higher than a "determination temperature" defined by adding a predetermined value a to the obtained environmental temperature. In the subsequent processing, the ink will be circulated until the temperature of the print head 8 becomes equal to or below the determination temperature. In other words, the determination temperature is a temperature serving as a benchmark for determining whether or not to circulate the ink after the completion of the printing operation. The processing is terminated in the case where the temperature of the print head 8 is equal to or below the determination temperature (NO in S1505). The processing proceeds to S1506 in the case where the temperature of the print head 8 is higher than the determination temperature (YES in S1505).

Here, regarding the value a for defining the determination temperature, the value a corresponding to the obtained environmental temperature is determined with reference to a table shown in FIG. 16. Note that the table in FIG. 16 is merely exemplary and a different table in which the environmental temperature is linked with the value a may be used instead. As shown in FIG. 16, the table is generally a table that renders the value a smaller as the environmental temperature becomes higher. An amount of saturated water vapor becomes larger as the temperature is higher, and an effect of evaporation of moisture in the ink grows larger after the cap closing. For this reason, in the case of the high environmental temperature, it is preferable to reduce the temperature of the print head 8 close to the environmental temperature, which is a limit temperature to which the temperature of the print head 8 can be reduced by circulating the ink. As a consequence, the value a is set to be gradually reduced as the environmental temperature becomes higher such that the determination temperature becomes a temperature close to the environmental temperature in the case where the environmental temperature is high.

In order to define the determination temperature, a mathematical expression that assigns the environmental temperature may be used for definition of the determination temperature instead of using the table. The table in FIG. 16 is stored in the ROM 203 in advance, so that the print controller 202 can refer to the table at a desired timing.

In S1506, the print controller 202 starts the circulation of the ink. In this embodiment, the circulation passages are provided for the respective ink colors so that the inks of the respective colors can be independently circulated. Here, the inks to be circulated are preferably circulated in accordance with a circulation mode that circulates the inks of all colors that represent ink types of all kinds. The discharge ports 1006 for each ink color are arranged on the same print element board 115 and the effect of heat accumulation may possibly spread across the discharge ports 1006 for all the colors. For this reason, in order to reduce the temperature of the print element board 115, it is preferable to carry out the circulation in the circulation mode corresponding to all-color circulation irrespective of the ink color that was circulated in a printing operation associated with a previous job.

In S1507, the print controller 202 causes the printing apparatus 1 to wait for 1 second. This waiting means maintenance of the state of carrying out the circulation of the ink without performing the printing operation. In short, the circulation of the ink is carried out for one second herein so as to cool down the print head 8.

In S1508, the print controller 202 obtains the current temperature of the print head 8 and the current environmental temperature once again.

The procedure in S1509 is the same as the procedure in S1505. The print controller 202 determines whether or not the temperature of the print head 8 is higher than the determination temperature. The processing proceeds to S1510 in the case where the temperature of the print head 8 is equal to or below the determination temperature (NO in S1509), where the print controller 202 terminates the processing by terminating the circulation of the ink.

The processing returns to the procedure in S1507 again in the case where the temperature of the print head 8 is higher than the determination temperature (YES in S1509). As a consequence, the procedures from S1507 to S1509 are repeated once in every second or so until the temperature of the print head 8 becomes equal to or below the determination temperature. In other words, the circulation of the ink is carried out until the temperature of the print head 8 becomes equal to or below the determination temperature.

The waiting time of 1 second in S1507 is merely exemplary and the waiting time is not limited only to 1 second. The waiting time may be set longer than 1 second in order to reduce the procedures performed by the print controller 202. On the other hand, the waiting time in S1507 may be set shorter than 1 second in an attempt to terminate the circulation of the ink in a timelier manner.

As described above, according to this embodiment, the temperature of the print head 8 can be reduced by circulating the ink in the case where the print head 8 is maintained at the high temperature even after the completion of the printing operation. In this way, it is possible to suppress the increase in thickness of the ink in the vicinity of the discharge port. Meanwhile, according to this embodiment, even in the case of occurrence of the increase in thickness of the ink in the vicinity of the discharge port after the completion of the printing operation, it is possible to collect the thickened ink by carrying out the all-color circulation. Thus, a discharge failure attributed to the thickened ink can be prevented. In the meantime, since the temperature of the print head 8 is determined once in every second, a necessary length of time can be set to the time for the circulation of the ink to be carried out after the completion of the printing operation. Accordingly, it is also possible to prevent condensation of the ink as a consequence of carrying out the circulation of the ink for a long time.

Sixth Embodiment

This embodiment will describe an aspect of circulating the ink in order to reduce the temperature of the print head 8 in the case where the temperature of the print head 8 is higher than the predetermined temperature. This embodiment will discuss a different embodiment from the fifth embodiment. In this embodiment, a description will be given mainly of differences from the first embodiment. The configurations and the procedures which are the same as those in the first embodiment will not be expressly stated herein.

Figure 17:
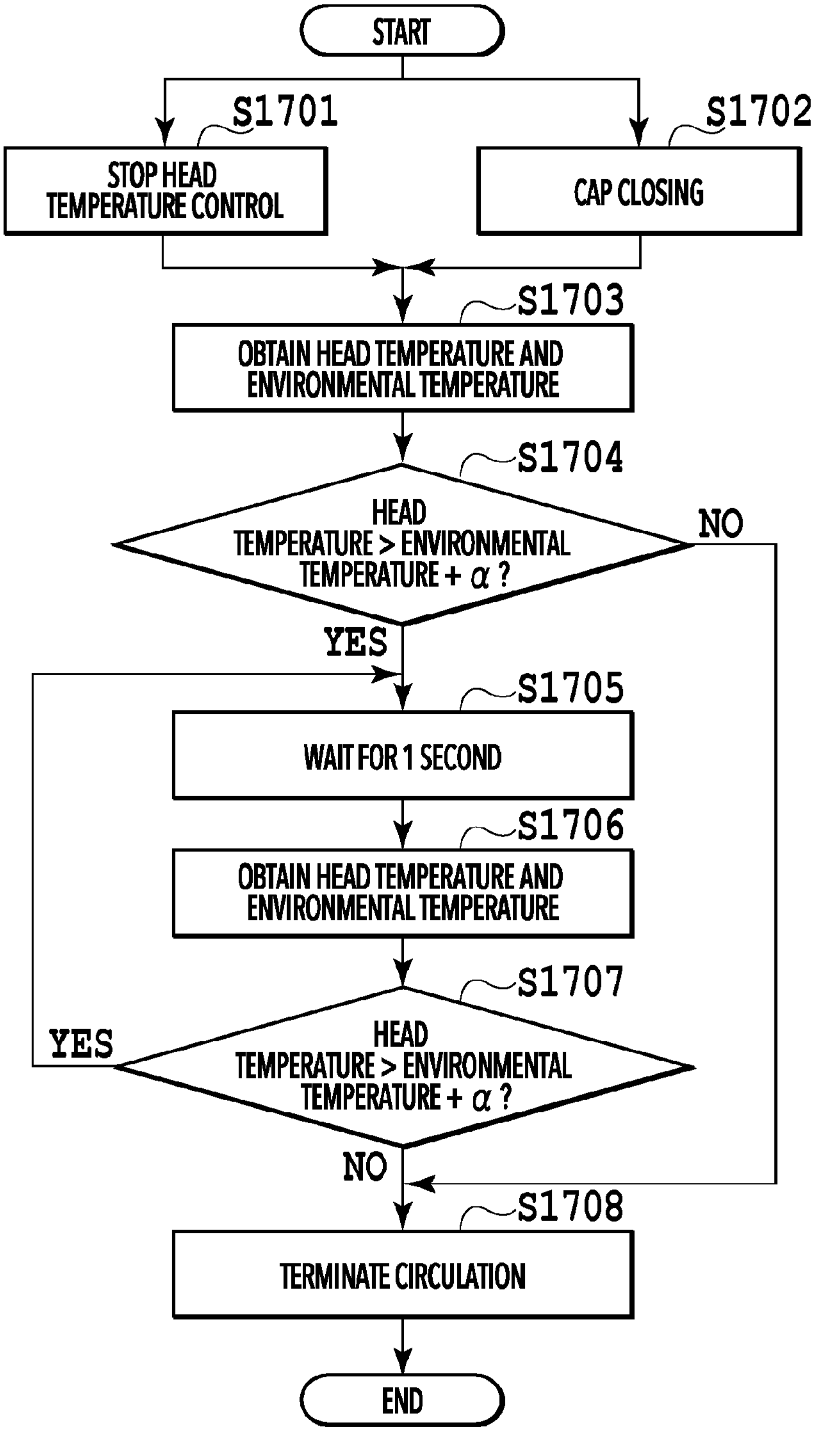
FIG. 17 is a flowchart showing processing to carry out the all-color circulation in accordance with the temperature of the print head.

FIG. 17 is a flowchart showing details of the processing of this embodiment. This flowchart is put into practice after the completion of the printing operation by the print head 8.

Unlike the fifth embodiment, the print controller 202 does not terminate the circulation of the ink along with the completion of the printing operation in this embodiment. Accordingly, in this embodiment, the print controller 202 stops the temperature adjustment of the print head 8 in S1701 after the completion of the printing operation, and the cap member 10*a* is brought into contact with the discharge port surface 8*a* of the print head 8 to establish the cap-closed state in S1702. The procedures in S1701 and S1702 are carried out in parallel and the processing proceeds to S1703 upon completion of the procedures in S1701 and S1702.

Procedures in S1703 and S1704 are the same as the procedures in S1504 and S1505, and explanations will therefore be omitted.

In the case where the temperature of the print head 8 is equal to or below the determination temperature (NO in S1704), the print controller 202 terminates the circulation of the ink in S1708 and terminates the processing. In the case where the temperature of the print head 8 is higher than the determination temperature (YES in S1704), the print controller 202 causes the printing apparatus 1 to wait for 1 second in S1705. Specifically, the ink is circulated in order to cool down the print head 8.

Here, the effect of heat accumulation in the print element board 115 may possibly spread across the discharge ports for all the colors. It is therefore preferable to carry out the all-color circulation in order to enhance the cooling effect. Accordingly, there is a case where the circulation of the ink is continued in a circulation mode to circulate only the black ink because the immediately preceding job processed by the printing apparatus 1 was a printing operation in a monochrome mode. In this case, the print controller 202 may switch the circulation mode to the circulation mode for the all-color circulation.

Here, the printing apparatus 1 of this embodiment is provided with the circulation passages for the inks of the respective colors and configured to carry out the circulation for each ink color. In this case, there is an aspect to drive pumps for circulating the inks of the respective colors by using a common motor. In the case of switching from the circulation mode to circulate only the black ink to the circulation mode to carry out the all-color circulation in this aspect, the circulation mode is switched by changing the drive of the motor. Accordingly, in the case of changing from the circulation mode to circulate only the black ink to the circulation mode to carry out the all-color circulation, the circulation of the black ink is suspended in order to change the drive of the motor.

Procedures in S1706 to S1708 are the same as the procedures in S1508 to S1510, and explanations will therefore be omitted.

As described above, according to this embodiment, the temperature of the print head 8 can be reduced by circulating the ink in the case where the print head 8 is maintained at a high temperature even after the completion of the printing operation. Thus, it is possible to suppress the increase in thickness of the ink in the vicinity of the discharge port. In this way, it is possible to prevent a discharge failure due to the increase in thickness of the ink. Meanwhile, since the temperature of the print head 8 is determined every second, it is possible to set a necessary length of time to the time for the circulation of the ink to be carried out after the completion of the printing operation, and also to prevent condensation of the ink as a consequence of carrying out the circulation of the ink for a long time.

Seventh Embodiment

This embodiment discusses an aspect to carry out the circulation of the ink after the completion of the printing operation in order to reduce the temperature of the print head 8 based on a time period of the printing operation associated with the previous job. Accordingly, in this embodiment, even if the printing apparatus 1 is not provided with an instrument for the temperature measurement, it is still possible to reduce the temperature of the print head 8 in the case where the print head 8 is maintained at a high temperature after the printing operation. In this embodiment, a description will be given mainly of differences from the first embodiment. The configurations and the procedures which are the same as those in the first embodiment will not be expressly stated herein.

Figure 18:
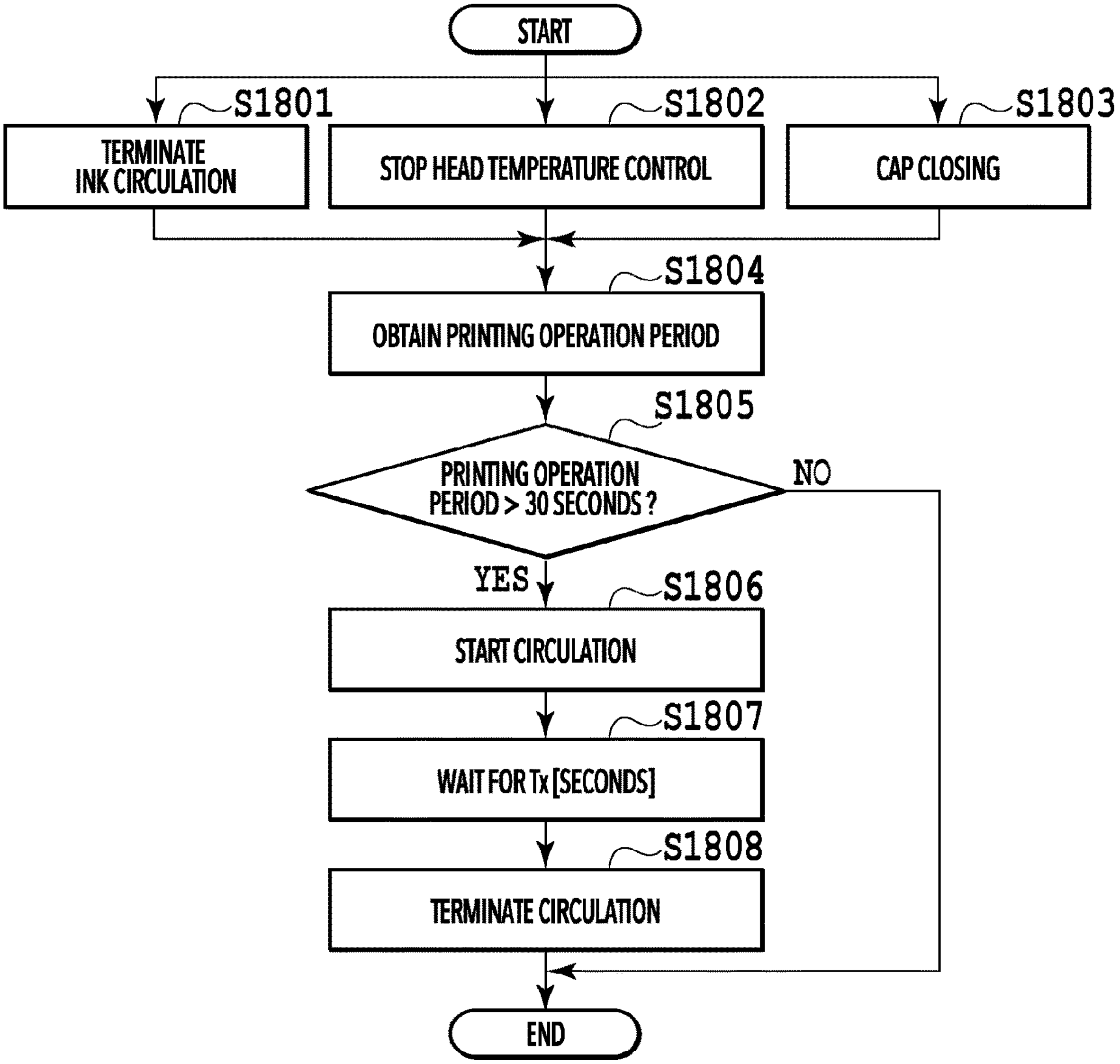
FIG. 18 is a flowchart showing processing to carry out the all-color circulation in accordance with a printing operation period.

FIG. 18 is a flowchart showing details of the processing of this embodiment. This flowchart is put into practice after the completion of the printing operation by the print head 8.

Procedures in S1801 to S1803 are the same as the procedures in S1501 to S1503, and explanations will therefore be omitted. After the completion of the printing operation, the procedures in S1801, S1802, and S1803 are carried out in parallel. The processing proceeds to S1804 upon completion of the procedures in S1801, S1802, and S1803.

In S1804, the print controller 202 obtains information concerning a printing operation period from the start to the end of the printing associated with the job processed before starting this flowchart. The printing apparatus 1 is provided with a timer as means for counting the printing operation period, and the print controller 202 obtains the printing operation period for the job measured with the timer.

In S1805, the print controller 202 determines whether or not the obtained printing operation period exceeds a predetermined period. The predetermined period is set to 30 seconds in this embodiment. The processing is terminated in the case where the obtained printing operation period is equal to or below 30 seconds being equal to or below the predetermined period (NO in S1805). The processing proceeds to S1806 in the case where the obtained printing operation period is a period longer than 30 seconds (YES in S1805). Here, the period of 30 seconds used for the determination is merely exemplary and the period is not limited to this numerical value.

A procedure in S1806 is the same as the procedure in S1506, and an explanation will therefore be omitted.

In S1807, the print controller 202 causes the printing apparatus 1 to wait for a certain period. To be more precise, the print controller 202 determines a waiting period Tx corresponding to the printing operation period with reference to a table shown in FIG. 19, and causes the printing apparatus 1 to wait for Tx seconds. In other words, the circulation of the ink is usually carried out along with the discharge of the ink that represents the printing operation. In this case, however, the print controller 202 circulates the ink for Tx seconds in accordance with the table in FIG. 19 while suspending the printing operation. In this way, it is possible to reduce the temperature of the circulation passage for the ink in the print head 8 inclusive of the vicinity of the discharge port.

Note that the table in FIG. 19 is merely exemplary and a different table in which the printing operation period is linked with the waiting period Tx may be used instead. As shown in FIG. 19, the table is generally a table that renders the waiting time Tx, which indicates the time period for circulating the ink, longer as the printing operation period becomes longer. In other words, the longer printing period may cause more heat accumulation in the support member 30. Meanwhile, a longer printing period may possibly increase the thickness of the ink in the vicinity of the discharge port regarding the ink of the color that has not been circulated. For this reason, the table in FIG. 19 is set such that the circulation period can be made longer as the printing operation period is longer. The table in FIG. 19 is stored in the ROM 203 in advance, so that the print controller 202 can refer to the table at a desired timing. Instead of the table in FIG. 19, the print controller 202 may determine the waiting period Tx by using a mathematical expression that assigns the printing operation period.

In S1808, the print controller 202 terminates the circulation of the ink and thus terminates the processing.

As described above, according to this embodiment, even if the printing apparatus 1 is not provided with the instrument for the temperature measurement, it is still possible to reduce the temperature of the print head 8 in the case where the print head 8 is maintained at a high temperature after the printing operation. In this way, it is possible to suppress the increase in thickness of the ink in the vicinity of the discharge port. Meanwhile, according to this embodiment, even in the case of occurrence of the increase in thickness of the ink in the vicinity of the discharge port, it is possible to collect the thickened ink by carrying out the all-color circulation. Thus, a discharge failure attributed to the thickened ink can be prevented. In the meantime, the period for circulating the ink after the completion of the printing operation is determined depending on the length of the printing period. Accordingly, it is also possible to prevent condensation of the ink as a consequence of carrying out the circulation of the ink for an unnecessarily long time.

Eighth Embodiment

This embodiment will describe an aspect of circulating the ink in order to reduce the temperature of the print head 8 in the case where the printing operation is carried out for a period longer than the predetermined period. This embodiment will discuss a different embodiment from the seventh embodiment. In this embodiment, a description will be given mainly of differences from the fifth embodiment. The configurations and the procedures which are the same as those in the fifth embodiment will not be expressly stated herein.

Figure 20:
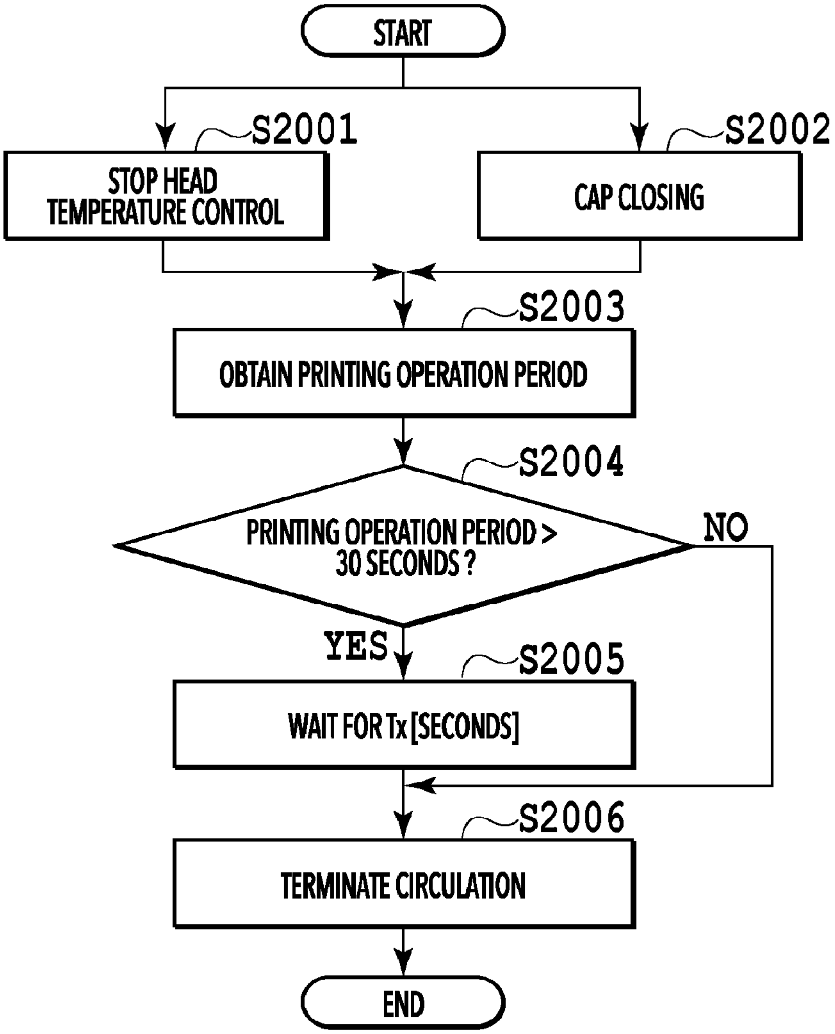
FIG. 20 is a flowchart showing processing to carry out the all-color circulation in accordance with the printing operation period.

FIG. 20 is a flowchart showing details of the processing of this embodiment. This flowchart is put into practice after the completion of the printing operation by the print head 8.

Unlike the seventh embodiment, the print controller 202 does not terminate the circulation of the ink along with the completion of the printing operation in this embodiment. Accordingly, in this embodiment, the print controller 202 stops the temperature adjustment of the print head 8 in S2001 after the completion of the printing operation, and the cap member 10*a* is brought into contact with the discharge port surface 8*a* of the print head 8 to establish the cap-closed state in S2002. The procedures in S2001 and S2002 are carried out in parallel and the processing proceeds to S2003 upon completion of the procedures in S2001 and S2002.

Procedures in S2003 and S2004 are the same as the procedures in S1804 and S1805, and explanations will therefore be omitted.

In the case where the printing operation period is longer than 30 seconds (YES in S2004), the print controller 202 causes the printing apparatus 1 to wait for Tx seconds in S2005 in accordance with the table in FIG. 19. In other words, the print controller 202 circulates the ink in the state of not carrying out the printing operation so as to cool the print head 8 down. In this instance, there may be a case where the immediately preceding job processed by the printing apparatus 1 is in the circulation mode to circulate only the black ink such as the printing operation in the monochrome mode and the ink is still circulated in that circulation mode. In this case, the print controller 202 may switch the circulation mode to the circulation mode for the all-color circulation.

In 52006, the print controller 202 terminates the circulation of the ink and thus terminates the processing.

As described above, according to this embodiment, even if the printing apparatus 1 is not provided with the instrument for the temperature measurement, it is still possible to reduce the temperature of the print head 8 by circulating the ink in the case where the print head 8 is maintained at a high temperature even after the completion of the printing operation. In this way, it is possible to suppress the increase in thickness of the ink in the vicinity of the discharge port. Meanwhile, the period for circulating the ink to be carried out after the completion of the printing operation is determined depending on the length of the printing period. Accordingly, it is also possible to prevent condensation of the ink as a consequence of carrying out the circulation of the ink for an unnecessarily long time.

OTHER EMBODIMENTS

The above-described embodiments have explained the aspect in which the print controller 202 is configured to carry out the series of processing. Instead, an aspect of carrying out the processing by the main controller 101 is also acceptable.

The above-described fourth to eighth embodiments have explained the aspect of providing the heater 113. However, an aspect without the heater is also acceptable.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited only the above-described embodiments and various changes and modifications are possible without departing from the gist and the scope of the present invention. Accordingly, the following claims are appended in order to clarify the scope of the present invention.

The invention claimed is:

1. A printing apparatus comprising:

a print head including a discharge port configured to discharge liquid which is supplied from a tank, wherein the print head is configured to perform a printing operation by discharging the liquid from the discharge port based on print data;

a flow path configured to communicate between the tank and the print head and to flow the liquid; and a circulation unit configured to perform circulation of the liquid in a circulation passage including the flow path, wherein the circulation unit performs the circulation for a predetermined time after discharging the liquid of the printing operation is completed, and wherein the predetermined time is equal to or longer than 3 seconds.

2. The printing apparatus according to claim 1, wherein the circulation passage includes the print head.

3. The printing apparatus according to claim 2, wherein the print head includes (1) a printing element corresponding to the discharge port for ejecting the liquid from the discharge port and (2) a pressure chamber which is an area facing the printing element and which is to be filled with the liquid to be discharged from the discharge port, and wherein the circulation passage includes the pressure chamber.

4. The printing apparatus according to claim 1, further comprising:

the tank, which is configured to contain the liquid to be supplied to the print head;

a supply flow passage configured to supply the liquid from the tank to the print head; and a collection flow passage configured to collect the liquid from the print head to the tank, wherein the circulation passage includes the tank, the supply flow passage, inside of the pressure chamber, and the collection flow passage.

5. The printing apparatus according to claim 1, wherein the predetermined time is equal to or shorter than 90 seconds.

6. The printing apparatus according to claim 1, wherein the circulation unit performs the circulation in a state where the printing operation is performed.

7. The printing apparatus according to claim 6, wherein the circulation unit continues the circulation for the predetermined time after the printing operation.

8. The printing apparatus according to claim 6, wherein the circulation unit (1) performs the circulation in a state where the printing operation is performed, (2) stops the circulation when the printing operation is finished, and (3) then starts and performs the circulation for the predetermined time.

9. The printing apparatus according to claim 6, wherein the circulation unit continues the circulation for the predetermined time after the printing operation is completed in a case where elapsed time of the circulation from a start of the circulation in association with the printing operation is below a defined value.

10. The printing apparatus according to claim 9, wherein at least one of the defined value and the predetermined time is set depending on an environment in which the printing apparatus is installed.

11. The printing apparatus according to claim 10, further comprising:

an obtaining unit configured to obtain at least one of a temperature and a humidity of the environment; and a setting unit configured to set at least one of the defined value and the predetermined time based on at least one of the temperature and the humidity.

12. The printing apparatus according to claim 11, wherein the setting unit sets the predetermined time at a first temperature to be longer than that at a second temperature lower than the first temperature, and wherein the setting unit sets the predetermined time at a first humidity to be longer than that at a second humidity higher than the first humidity.

13. The printing apparatus according to claim 11, further comprising:

a cap unit configured to cap the discharge port, wherein the cap unit is moved away from the discharge port in a state where the printing operation is performed, wherein after the printing operation is completed, the cap unit is brought into contact with the discharge port, and wherein the setting unit sets the defined value by using a time period of movement of the cap unit.

14. The printing apparatus according to claim 1, further comprising a cap unit configured to cap the discharge port, wherein the circulation unit performs the circulation while the cap unit caps the discharge port.

15. The printing apparatus according to claim 1, further comprising a cap unit configured to cap the discharge port, wherein the circulation unit performs the circulation after the cap unit caps the discharge port.

16. The printing apparatus according to claim 1, further comprising an adjustment unit configured to adjust a temperature of the print head, wherein the adjustment unit performs an adjustment of the temperature in a case where the printing operation is performed, and wherein when the printing operation is finished, the adjustment unit stops the adjustment of the temperature and the circulation unit performs the circulation.

17. The printing apparatus according to claim 1, wherein the circulation unit performs the circulation in a case where a specified ink is circulated.

18. The printing apparatus according to claim 17, wherein the specified ink is a black ink.

19. The printing apparatus according to claim 1, further comprising a determination unit configured to determine whether the circulation unit is caused to perform the circulation based on a temperature of the print head and an environmental temperature.

20. A method of a printing apparatus, the printing apparatus including (1) a print head including a discharge port configured to discharge liquid which is supplied from a tank, wherein the print head is configured to perform a printing operation by discharging the liquid from the discharge port based on print data, (2) a flow path configured to communicate between the tank and the print head and to flow the liquid; and (3) a circulation unit configured to perform circulation of the liquid in a circulation passage including the flow path, the method comprising:

performing the circulation for a predetermined time after discharging the liquid of the printing operation is completed, wherein the predetermined time is equal to or longer than 3 seconds.

21. The method according to claim 20, wherein the predetermined time is equal to or shorter than 90 seconds.

22. The method according to claim 20, wherein the circulation is performed in a state where the printing operation is performed.

23. The method according to claim 22, wherein the circulation is continued for the predetermined time after the printing operation.

24. The method according to claim 22, wherein the circulation is performed in a state where the printing operation is performed, and wherein the circulation is stopped when the printing operation is finished, and then the circulation is started for the predetermined time.

* * * * *